(12) United States Patent
Mori et al.

(10) Patent No.: US 6,551,493 B2
(45) Date of Patent: Apr. 22, 2003

(54) ULTRAVIOLET LIGHT MEASURING CHIP AND ULTRAVIOLET LIGHT SENSOR USING THE SAME

(75) Inventors: Kazuyoshi Mori, Kasuga (JP); Takeshi Nishida, Ogori (JP); Hideaki Hashimoto, Miyaki-gun (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/820,637

(22) Filed: Mar. 30, 2001

(65) Prior Publication Data

US 2001/0027926 A1 Oct. 11, 2001

(30) Foreign Application Priority Data

Apr. 4, 2000 (JP) ........................................ 2000-101949
Apr. 4, 2000 (JP) ........................................ 2000-101955

(51) Int. Cl.[7] ............................................ G01N 27/403
(52) U.S. Cl. ..................... 205/775; 205/787; 205/793.5; 204/400; 204/406; 204/407; 204/412; 250/473.1
(58) Field of Search ................. 204/400, 406, 204/407, 412; 205/775, 787, 793.5; 250/473.1, 474.1

(56) References Cited

U.S. PATENT DOCUMENTS 3,628,017 A * 12/1971 Lerner ....................... 204/400
3,873,215 A * 3/1975 Quinlan ....................... 136/263
4,372,680 A * 2/1983 Adams et al. ............ 250/338.1
4,853,548 A * 8/1989 Stevens ..................... 250/473.1
5,696,381 A * 12/1997 Quintern .................. 250/472.1
6,146,514 A    11/2000 Takamura et al.

FOREIGN PATENT DOCUMENTS

JP          9304177         11/1997

* cited by examiner

Primary Examiner—Robert J. Warden, Sr.
Assistant Examiner—Kaj K. Olsen
(74) Attorney, Agent, or Firm—Stevens, Davis, Miller & Mosher, LLP

(57) ABSTRACT

An ultraviolet light measuring chip and a sensor are provided simple in structure, easy to handle and of high precise measurement. The chip comprises a first reaction chamber for detection of total received light and a second reaction chamber for detection of ultraviolet-cut received light. The first and second chambers contain or hold therein counter and reference electrodes immersed in coexistent electrolyte solution containing quinone, organic solvent and electrolyte the solution being also contained the chambers. The first chamber has a total light transmission window and a first working electrode immersed in the electrolyte solution. The second chamber has an ultraviolet-cut light transmission window and a second working electrode immersed in the electrolyte solution. The sensor is adapted to sweep voltages of the first and second working electrodes to the respective reference electrodes, detect respective currents and calculate out an amount of ultraviolet light from difference of the detected currents.

18 Claims, 10 Drawing Sheets

ULTRAVIOLET LIGHT MEASURING CHIP AND ULTRAVIOLET LIGHT SENSOR USING THE SAME

BACKGROUND OF THE INVENTION

The present invention relates to an ultraviolet light measuring chip comprising a first reaction chamber for receiving the total light and a second reaction chamber for receiving the light with the ultraviolet light cut off to measure the amount of ultraviolet light, and an ultraviolet light sensor including the ultraviolet light measuring chip for calculating the amount of ultraviolet light electrochemically.

The light having a wavelength in the range of 400 to 770 nm is called visible light which is visible to human eyes. In this wavelength range, the light having the shortest wavelength of about 400 nm is violet light, and the light in proximity to the violet light and having a still shorter wavelength is called the ultraviolet light. The ultraviolet light are of three types. One is the UV-A wave in the wavelength range of 320 to 400 nm having the property of attacking the corium partially through the epidermis cuticle and causing wrinkles and bags. The second type of ultraviolet light is called the UV-B wave having a wavelength of 290 to 320 nm. The UV-B wave, which is interrupted by the epidermis cuticle and causes the skin cancer, spots or freckles, has the strongest effect on the human skin. The third type of the ultraviolet light is called the UV-C wave which has a wavelength of 290 nm or less. The UV-C wave, which is mostly absorbed into the ozone layer, has an effect on genes and causes the skin cancer. The visible light having the longest wavelength is the red light having a wavelength of about 760 nm. The light having a longer wavelength than 760 nm is called the infrared light. The infrared light having a short wavelength of about 760 nm is called the near infrared light, and the infrared light having a long wavelength of 50 to 1000 μm is called the far infrared light. The last-mentioned light is used for heating or the like purposes and is an energy wave most easily absorbed into the human being.

The most harmful one of the lights described above is the ultraviolet light. The ultraviolet light has an effect on the human skin as described above including a serious effect changing the skin tissue to a morbid state and a lighter effect commonly seen in our daily life. Specifically, when melanocyte (pigment cell) contained in the skin is exposed to ultraviolet light, the melanin pigment is produced so that the skin is blackened or formed with spots or freckles. On the other hand, the most serious effect that leads to morbidity is the fact that the ultraviolet light damages the genes in the nuclei of the skin cells and develops a cancer. Normally, genes, even when partially damaged, are healed by counteracting enzymes. In the case where a strong sunburn or wound is caused by a great amount of exposure, however, the recovery by enzymes is so insufficient that cells develop a mutation and lead to a cancer in many cases.

The chlorofluoro hydrocarbon gas, which has been widely used for a long time as an apparently stable, superior refrigerant carrier, has been discharged into the atmosphere without sufficient verification and has come to destroy the ozone layer covering the atmosphere of the earth. The ozone layer has the important function of cutting off the ultraviolet light showered on the earth and thus protecting the living creatures. As the result of destruction of the ozone layer, the ultraviolet light has increasingly come to reach the surface of the earth, and has caused increased cases of skin cancer, thus greatly affecting the living creatures. The morbidity rate of the skin cancer in Japan has increased from one for each about 100 thousand persons in the 1960s and 1970s to about 5 per 100 thousand persons at present. This rate change is regarded as a considerable increase though still remarkably small as compared with 800 per 100 thousands in Australia and 250 per 100 thousands in the U.S.A. It is also reported that a 1% decrease of ozone increases ultraviolet light by 2% and skin cancer cases by 3 to 5% ("Medical Renaissance", by Masamitsu Ichihashi, published by Yomiuri Shimbun (on-line)).

A study was made of the percentage of which skin cancer cases represent the outpatients who visited the departments of dermatology of 24 university-attached hospitals throughout Japan in the 1970s and 1980s. Comparison between the 1970s and the 1980s shows that the number of skin cancer patients in the 1980s suffering from basal-cell carcinoma at the same level as the lowest layer of the epidermis increased by 17% and patients of solar keratodermia, a skin precancerosis, characterized by red or black speckles and sores of the skin increased by 84%. Therefore, children playing freely in daylight or outdoor, which is an important factor for growth, are adversely affected after being exposed to a great amount of sunlight for long hours in sports or recreation, indicating the necessity of protection against the ultraviolet light by wearing shirts of long sleeves or applying anti-sunburn cream. Especially, patients of xeroderma pigmentosum, who suffer from an extreme sunburn even under a small amount of ultraviolet light and have a hereditary defect in the enzyme system for repairing the genes damaged by the ultraviolet light, are liable to be attacked by cancer at the rate 1000 to 2000 times higher than normal people, and therefore require a very careful measure for protection against the ultraviolet light.

An experiment indicating the great importance of protection against the ultraviolet light is being conducted by Professor Masamitsu Ichihashi, Kobe University. In the experiment, two sisters, 4 and 2 years old, suffering from xeroderma pigmentosum were thoroughly instructed to take a protective measure against the ultraviolet light by applying an anti-sunburn cream and wearing a hat and thus to guard against the effect of the ultraviolet light. In this way, a follow-up check was conducted to determine the degree to which the preceding unprotected period different by two years between them relates to the production of cancer. Both of the two sisters finally came to suffer from cancer, the elder sister at the age of 13 and the younger sister at the age of 23. In other words, the elder sister who had been exposed to ultraviolet light without protection for two years longer in her infancy developed cancer 10 years earlier. This indicates how it is important to protect against the ultraviolet light. In addition, the ultraviolet light adversely affects the immune mechanism of the skin. An animal experiment has proved that the immunity of the whole body is reduced by the radiation of the ultraviolet light thereby to increase the tendency of suffering from an infectious disease.

The reduced immunity cannot eliminate cancer cells, if any are developed. A research conducted in the U.S.A. reports that under the exposure to the ultraviolet light four times larger in amount than an assumed reference at which the skin becomes slightly reddish, the immunity of 40% of ordinary persons and 95% of skin cancer patients failed to work normally.

In Europe and America, the danger of sunburn is widely known. In Japan, where most of the skin cancer cases are old people, the period before the cancer develops is in most cases longer than when younger people suffer. Generally, therefore, it is said that Japanese people are less conscious of the ultraviolet light. Now that the ozone layer has begun to be destroyed, however, we cannot take things easy thinking that it has nothing to do with us.

In the ozone layer, oxygen ($O_2$) in the stratosphere is changed to ozone ($O_3$) by the action of the ultraviolet light showered on the earth and thus increased in density. This reaction cuts off the harmful ultraviolet light such as UV-C rays not contained in the sunlight and protects the living creatures on the earth. As explained above, however, chlorofluoro hydrocarbon has been widely used as a refrigerant or a detergent of semiconductors and the like and has continued to be discharged into the atmosphere without taking note of the adverse effect that it has on the environment for the past score of years. It is said that chlorine contained in chlorofluoro hydrocarbon is released under the ultraviolet light in the stratosphere, and reacting with ozone in the ozone layer, decomposed into oxygen and CLO compound. The resultant reduction in ozone concentration causes the ozone layer to lose the ability to cut off the harmful ultraviolet light, which reaches the surface of the earth daily, with the result that the living creatures come to be unconsciously exposed to a such great amount of ultraviolet light as to have a serious effect on the life thereof.

Thus, the necessity of actually measuring the amount of the ultraviolet light to which we are exposed in daily life has now increased more than ever before. In view of this situation, both the Environment Protection Agency and the Meteorological Agency started in 1993 to monitor the ultraviolet light in Tokyo. Nevertheless, only a small number of instruments are available for measuring the ultraviolet light.

The conventional ultraviolet light measuring instruments will be explained. The Brillouin spectrophotometer is a typical example. The Brillouin spectrophotometer has such characteristics that the UVB ultraviolet rays can be spectrophotometrically observed with high accuracy for the wavelength of each 0.5 nm. The Brillouin spectrophotometer, however, somewhat lacks stability and requires strict maintenance and control. Other ultraviolet light measuring instruments include a UV sensor which, when exposed to sunlight, gradually changes in color from white to blue. The amount of ultraviolet light is measured by observing the change of the color. As still another instrument, the ultraviolet light strength sensor is for measuring the ultraviolet light electrochemically (JP-A-9-304177). The ultraviolet light strength sensor comprises a light radiation unit with a quartz fiber mounted at an end thereof, a UV bandpass filter for retrieving only the ultraviolet light component from the light introduced by the quartz fiber, a photometer unit having a light strength sensor for measuring the strength of the ultraviolet light component, and a strength meter body having a display unit for displaying the strength of the ultraviolet light based on the ultraviolet light strength signal input from the photometer unit.

SUMMARY OF THE INVENTION

An object of the present invention is to provide an ultraviolet light measuring chip simple in structure and easy to handle and capable of measuring the amount of ultraviolet light at low cost and high accuracy with a small amount of an agent regardless of the length of the light receiving time.

Another object of the present invention is to provide a compact ultraviolet light measuring chip easy to operate and transport, and capable of measuring the amount of ultraviolet light at low cost and high accuracy with a small amount of an agent regardless of the length of the light receiving time.

In order to achieve the objects of the invention, according to one aspect of the present invention, there is provided an ultraviolet light measuring chip comprising a total received light amount detection unit and an "ultravioletless" received light amount detection unit, wherein the total light received amount detection unit is formed with a first reaction chamber accommodating a coexistent electrolyte solution containing quinone, an organic solvent and an electrolyte and including a first light transmission window having a total light transmission plate, the ultravioletless received light amount detection unit is formed with a second reaction chamber accommodating a coexistent electrolyte solution containing quinone, an organic solvent and an electrolyte and including a second light transmission window having an ultravioletless light transmission plate, the first reaction chamber and the second reaction chamber have arranged therein a counter electrode and a reference electrode extending over the two reaction chambers and immersed in the coexistent electrolyte solutions, the first reaction chamber has arranged therein a first working electrode immersed in the coexistent electrolyte solution, the second reaction chamber has arranged therein a second working electrode immersed in the coexistent electrolyte solution, and a plurality of terminals are connected electrically to the first working electrode, the second working electrode, the counter electrode and the reference electrode.

As a result, the ultraviolet light measuring chip according to this invention is simple in structure and easy to handle and can measure the amount of ultraviolet light at low cost and high accuracy with a small amount of an agent regardless of the length of the light receiving time.

According to another aspect of the invention, there is provided an ultraviolet light sensor comprising: a measuring chip insertion unit having the ultraviolet light measuring chip inserted therein and having a connector terminal capable of being connected to each of the terminals; a control unit including a first power supply adapted to apply a voltage between the first working electrode and the counter electrode and a second power supply adapted to apply a voltage between the second working electrode and the counter electrode when the ultraviolet light measuring chip is inserted, said control unit sweeping the potential between the first working electrode and the reference electrode and between the second working electrode and the reference electrode; and an arithmetic unit including a first detection unit for detecting the current flowing between the first working electrode and the counter electrode and a second detection unit for detecting the current flowing between the second working electrode and the counter electrode, said arithmetic unit calculating the amount of the ultraviolet light from the difference between the current value detected by the first detection unit and the current value detected by the second detection unit.

As a result, the ultraviolet light sensor according to this invention is compact, easy to operate and transport, and can measure the amount of ultraviolet light at low cost and high accuracy with a small amount of an agent regardless of the length of the light receiving time.

DESCRIPTION OF THE EMBODIMENTS

Now, embodiments of the present invention will be explained with reference to the drawings.
(First Embodiment)

Figure 1:
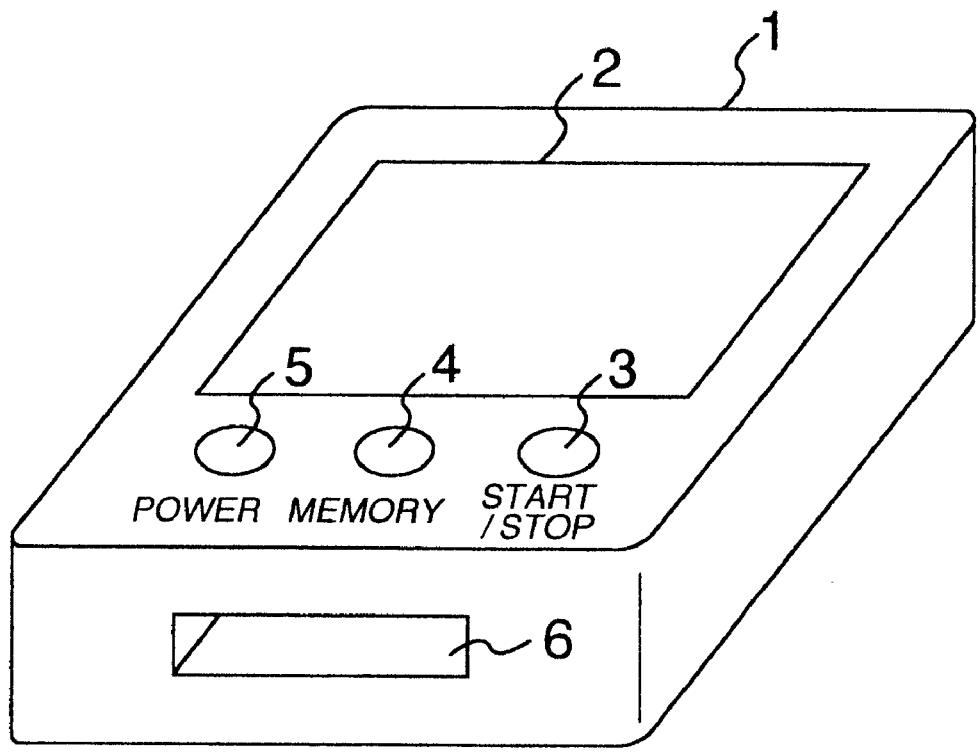
FIG. 1 schematically shows an outer appearance of an ultraviolet light sensor according a first embodiment of the invention.
Figure 1:
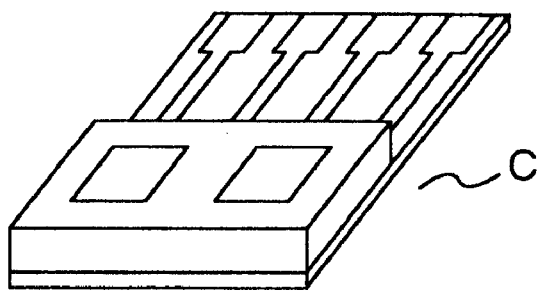

First, an ultraviolet light sensor and an ultraviolet light measuring chip according to an embodiment of the invention will be explained in detail with reference to the drawings. FIG. 1 is a schematic diagram showing the outer appearance of an ultraviolet light sensor according to the first embodiment of the invention. In FIG. 1, reference numeral 1 designates a body, numeral 2 a display unit for displaying by converting the measurement into the amount of ultraviolet light, numeral 3 a start/stop button for starting the measurement, numeral 4 a mode switch button for accessing the stored data or switching the various modes, numeral 5 a power button for switching on/off the power supply, and numeral 6 a measuring chip insertion unit which the ultraviolet light measuring chip (hereinafter sometimes referred to as the measuring chip) C is inserted into and electrically connected for measuring the amount of ultraviolet light after receiving the ultraviolet light by the measuring chip. The measuring chip insertion unit 6 has therein a connector terminal (not shown) that can be connected to the terminal of the measuring chip C.

Figure 2:
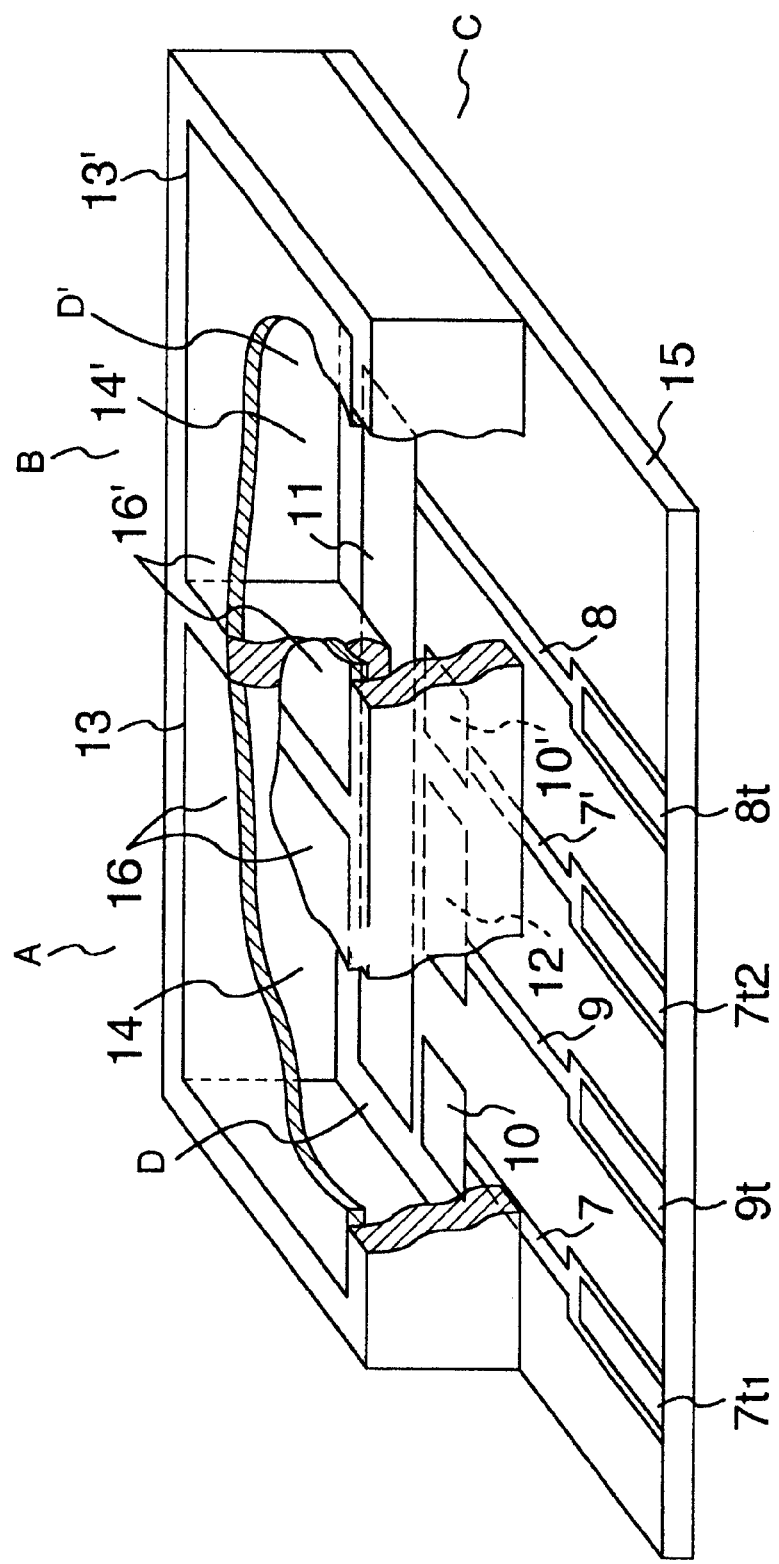
FIG. 2 is a diagram for explaining an ultraviolet light measuring chip of the ultraviolet light sensor according to the first embodiment of the invention.

FIG. 2 is a diagram for explaining the ultraviolet light measuring chip of the ultraviolet light sensor according to the first embodiment of the invention. Numeral 7 designates a first working electrode pattern, numeral 7' a second working electrode pattern, numeral 8 a counter electrode pattern, numeral 9 a reference electrode pattern, numeral 10 a first working electrode, numeral 10' a second working electrode, numeral 11 a counter electrode, and numeral 12 a reference electrode. Reference character 7t1 designates a terminal of the first working electrode, character 7t2 a terminal of the second working electrode, character 8t a terminal of the counter electrode, and character 9t a terminal of the reference electrode. Numeral 15 designates a base board.

The first working electrode pattern 7 is printed as a thin strip by screen printing a conductive carbon paste containing a resin binder on the base board 15. The first working electrode pattern 7 is connected to the first working electrode 10. The first working electrode 10 is configured of a thin film of a glass-like carbon electrode called glassy carbon, a thin film of a carbon material made by forming and sintering a plastic called PFC (plastic formed carbon) at 1000° C. to 2000° C., or a thin film formed by depositing by evaporation or sputtering gold. The second working electrode 10' is also made in quite the same way preferably. Instead of making the first working electrode 10 and the first working electrode pattern 7 separately from each other as described above, the fabrication steps and cost can be desirably reduced by forming the first working electrode 10 integrally with the first working electrode pattern 7 by screen printing the former with conductive carbon paste as a thin film. This integral forming process for the first working electrode 10 is also preferably applicable similarly to the second working electrode 10'.

Then, the counter electrode pattern 8 is formed as a thin film strip by screen printing the conductive carbon paste containing a resin binder on the base board 15. The counter electrode pattern 8 is connected to the counter electrode 11. The counter electrode 11 is composed of an anticorrosive conductive material of platinum, graphite, gold, stainless steel, aluminum or the like. Like the first working electrode 10 and the first working electrode pattern 7, the counter electrode 11 is also preferably configured not separately from but integrally with the counter electrode pattern 8 using the conductive carbon paste to reduce the fabrication steps and the cost.

Further, the reference electrode pattern 9 is formed as a thin film strip by screen printing the conductive carbon paste containing a resin binder on the base board 15. The reference electrode pattern 9 is connected to the reference electrode 12. The reference electrode 12 is configured of a thin film of a glass-like carbon electrode called glassy carbon, a thin film of a carbon material formed by sintering a plastic called PFC at 1000° C. to 2000° C., or a thin film formed by depositing by evaporation or sputtering gold.

The terminal 7t1 of the first working electrode, the terminal 8t of the counter electrode, the terminal 9t of the reference electrode and the terminal 7t2 of the second working electrode are preferably reinforced by making them of a conductive material such as platinum, gold or stainless steel in order to increase the contact strength of the connector and secure an electrical connection small in resistance.

In FIG. 2, numeral 13 designates a first light transmission window, numeral 13' a second light transmission window, numeral 14 a first reaction chamber, numeral 14' a second reaction chamber, numeral 16 a total light transmission plate, and numeral 16' an ultraviolet light cutting transmission plate for transmission of ultravioletless light. The first light transmission window 13 for transmitting the total light is opened to the surface of the first reaction chamber 14, and the total light transmission plate 16 is mounted on the first light transmission window 13. In similar fashion, the second light transmission window 13' for transmitting the light from which only the ultraviolet light is cut off is opened to the surface of the second reaction chamber 14', and the ultravioletless light transmission plate 16' is mounted on the second light transmission window 13.

The first reaction chamber 14 and the second reaction chamber 14' respectively constitute independent spaces and both accommodate or hold therein the same coexistent electrolyte solution. The counter electrode 11 and the reference electrode 12 are arranged in the two reaction chambers at the same time and immersed in the coexistent electrolyte solution. The counter electrode 11 and the reference electrode 12 are of course inserted into the two reaction chambers in water tight fashion. Further, the first working electrode 10 is arranged in the first reaction chamber 14, and the second working electrode 10' in the second reaction chamber 14'. The first working electrode 10, the second working electrode 10', the counter electrode 11 and the reference electrode 12 are arranged out of contact with each other, and led out by the first working electrode pattern 7, the second working electrode pattern 7', the counter electrode pattern 8 and the reference electrode pattern 9, respectively. The terminals of the first working electrode pattern 7, the second working electrode pattern 7', the counter electrode pattern 8 and the reference electrode pattern 9 thus led out are connected to the terminal 7t1 of the first working electrode, the terminal 7t2 of the second working electrode, the terminal 8t of the counter electrode and the terminal 9t of the reference electrode, respectively. When the measuring chip C is mounted by being inserted into the measuring chip insertion unit 6, the connector terminal and each of the terminals are electrically connected to each other. An insulating material is of course covered on the entire surfaces of the first working electrode pattern 7, the counter electrode pattern 8 and the reference electrode pattern 9, with the exception of the electrode portions of the first working electrode 10, the counter electrode 11 and the reference electrode 12 and the terminal portions of the terminal 7t1 of the first working electrode, the terminal 8t of the counter electrode and the terminal 9t of the reference electrode.

As described above, the first working electrode 10, the counter electrode 11 and the reference electrode 12 are arranged out of contact with each other in the first reaction chamber 14. The counter electrode 11 and the reference electrode 12, which are required to be shared by the second reaction chamber 14', are arranged in such a manner as to extend in parallel from the second reaction chamber. In similar fashion, the second working electrode 10', the counter electrode 11 and the reference electrode 12 are arranged out of contact with each other in the second reaction chamber 14'. The counter electrode 11 and the reference electrode 12, which are required to be shared by the first reaction chamber 14, are arranged in such a manner as to extend from the first reaction chamber.

As will understood from the foregoing description, according to the first embodiment, the counter electrode 11 and the reference electrode 12 are shared by the first reaction chamber 14 and the second reaction chamber 14'. Therefore, the structure of the measuring chip C can be greatly simplified and the ultraviolet light sensor can also be reduced in size. In addition, the first working electrode pattern 7, the second working electrode pattern 7', the counter electrode pattern 8 and the reference electrode pattern 9 are all led out in parallel, and the terminal 7t1 of the first working electrode, the terminal 7t2 of the second working electrode, the terminal 8t of the counter electrode and the terminal 9t of the reference electrode constituting the terminal portions are also arranged in parallel to each other substantially at equal pitches. These terminals are connected electrically to the connector terminal in the measuring chip insertion unit 6.

The first reaction chamber 14 and the second reaction chamber 14' according to the first embodiment accommodate a coexistent electrolyte solution D and a coexistent electrolyte solution D', respectively, for measuring the received light amount electrochemically. The coexistent electrolyte solution D and the coexistent electrolyte solution D' have the same components including quinone dissolved in an organic solvent such as ethanol or isopropyl alcohol, to which an electrolyte such as sodium chloride or lithium chloride is added. Examples of quinone used include p-benzoquinone, 3-methyl-p-benzoquinone, o-benzoquinone, diphenoquinone, naphthoquinone, anthraquinone, benzene azohydoquinone and derivatives of them. They also include quinone groups. According to the first embodiment, the coexistent electrolyte solutions D, D' are specifically so composed that 20 mM of 3-methyl-p-benzoquinone and 150 mM of sodium chloride are dissolved in a solvent of ethanol and water mixed in the ratio of 8 to 2.

The total light transmission plate 16 is mounted in the first reaction chamber 14 accommodating the coexistent electrolyte solution D. The total light transmission plate 16 preferably is made of quartz glass, diamond, single crystal of sodium chloride or titania having the ultraviolet light transmittance of 99%. On the other hand, the ultravioletless light transmission plate 16' is mounted in the second reaction chamber 14' accommodating the coexistent electrolyte solution D'. This ultravioletless light transmission plate 16' is made of such a resin material such as transparent vinyl chloride resin, acrylic resin, polycarbonate resin or methacrylic resin which cuts off at least 90% of the ultraviolet light and transmits other light rays such as infrared light, or ordinary glass covered with an ultraviolet light cutting filter having the surface thereof specially treated with a mild vinyl film, a polyurethane film, a polyester film, etc.

In this way, the first light transmission window 13 is arranged and the total light transmission plate 16 is fitted in the first reaction chamber 14 accommodating therein the coexistent electrolyte solution D, in which the first working electrode 10, the counter electrode 11 and the reference electrode 12 are immersed. These component parts make up a total received light amount detection unit A of the measuring chip C according to the first embodiment. In similar fashion, the second light transmission window 13' is arranged and the ultravioletless light transmission plate 16' is fitted in the second reaction chamber 14' accommodating the coexistent electrolyte solution D', in which the second working electrode 10', the counter electrode 11 and the reference electrode 12 are similarly immersed. These component parts make up an ultravioletless received light amount detection unit B of the measuring chip C according to the first embodiment.

In order to secure the same effect on quinone with the exception of the effect of ultraviolet light and also to have the counter electrode 11 and the reference electrode 12 be shared positionally by the first reaction chamber 14 and the second reaction chamber 14', the total received light amount detection unit A and the ultravioletless received light amount detection unit B are arranged in close proximity to each other. The total received light amount detection unit A and the ultravioletless received light amount detection unit B are made of the same electrode material and the same electrode pattern material, and the coexistent electrolyte solutions D, D' have the same composition and are placed under the same environmental conditions.

Figure 3:
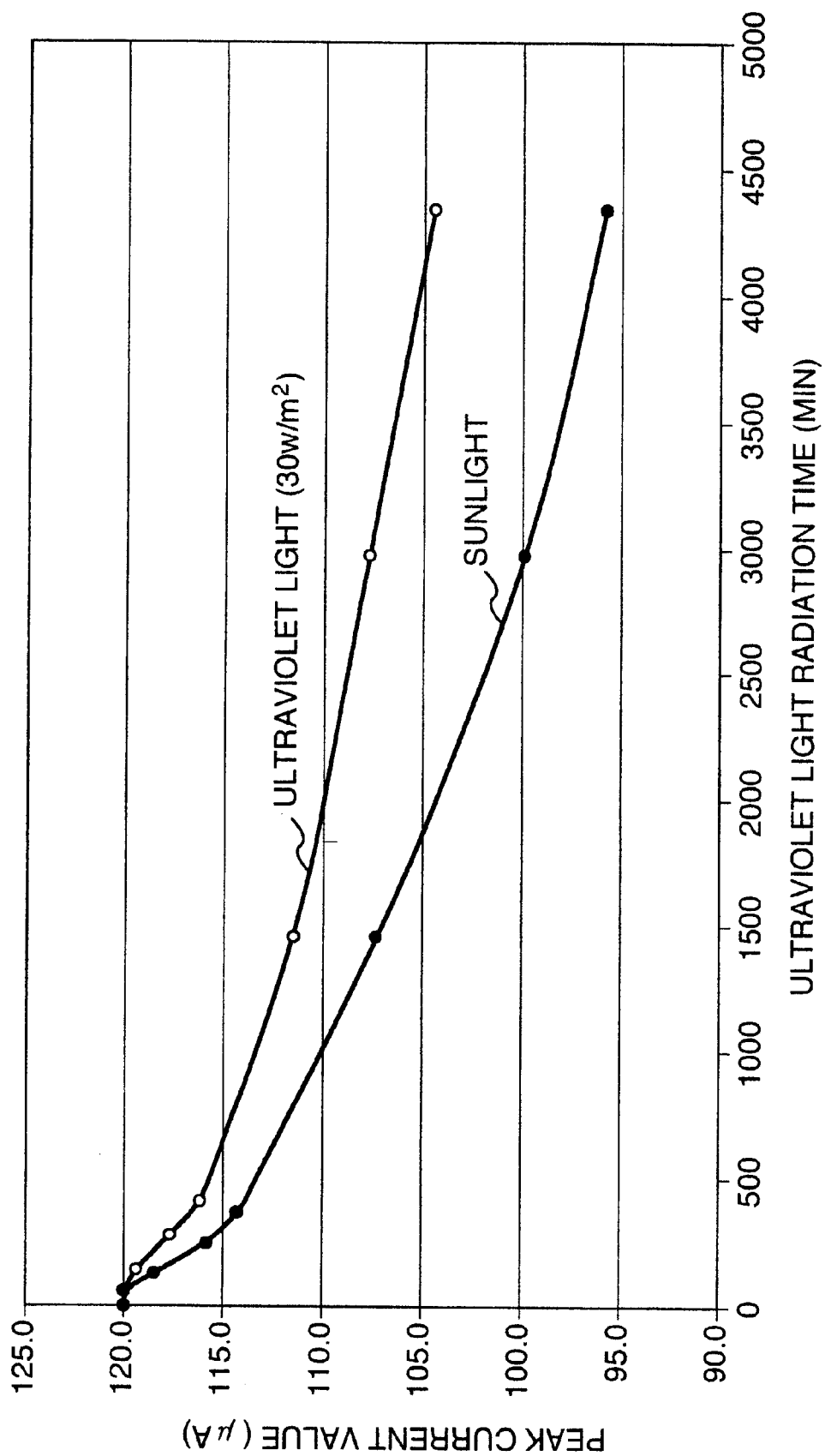
FIG. 3 is a graph showing the relation between the time during which light is radiated on the coexistent electrolyte solution containing quinone and the peak value of the quinone reduction current.

Now, an explanation will be given of the reason why the amount of ultraviolet light can be detected by the measuring chip C according to the first embodiment. FIG. 3 is a graph showing the relation between the time during which the coexistent electrolyte solution containing quinone is exposed to light radiation and the peak value of the quinone reduction current. Quinone is 3-methyl-p-benzoquinone, and the light radiated is the sunlight corresponding to the total light and the ultraviolet light of 30 W/m$^2$. The measurement conditions involved are that the working electrode and the reference electrode are made of glassy carbon and the counter electrode of platinum, the working electrode has an area of 3.2 mm$_2$, and the coexistent electrolyte solution is a mixture of 20 mM of 3-methyl-p-benzoquinone, 150 mM of sodium chloride and an 8-to-2 ethanol-water mixture. A voltage is applied between the working electrodes and the counter electrode in such a manner that the working electrodes are at the sweeping potential based on the potential of the reference electrode, and the reduction current having a peak at the reduction current of 3-methyl-p-benzoquinone is obtained by sweeping at the rate of 100 mV/sec. As described later, the reduction current may alternatively be obtained by applying a predetermined voltage and measuring the Faraday current instead of by sweeping. As shown in FIG. 3, both in the case where ultraviolet light is received and in the case where the total sunlight is received, the peak value of the quinone reduction current decreases with the increase in the receiving time. Thus, the ultraviolet light of known strength is radiated on the measuring chip whereby the coexistent electrolyte solution with a reduced amount of 3-methyl-p-benzoquinone is electrochemically measured to produce an analytical or amount measurement curve with the light receiving time and the strength of ultraviolet light as variables. In this way, the amount of ultraviolet light that the measuring chip has received can be determined simply by measuring the amount of 3-methyl-p-benzoquinone.

However, the degeneration of quinone is affected by light alone. The ambient temperature and other factors than light have a great effect on quinone degeneration. In view of this, according to this invention, the coexistent electrolyte solution exposed to light with only the ultraviolet light cut off and the coexistent electrolyte solution exposed to the same conditions as the first coexistent electrolyte solution except that ultraviolet light is not cut off are serially measured substantially at the same time. The conditions are exactly the same for the two electrolyte solutions except for the absence of ultraviolet light. Once the amount of quinone in the two coexistent electrolyte solutions is measured, therefore, the extra amount of quinone reduced in the coexistent electrolyte solution exposed to ultraviolet light is seen to be proportional to the received amount of ultraviolet. In this way, the difference is determined between the coexistent electrolyte solution measured with ultraviolet light cut off and the coexistent electrolyte solution measured by being exposed to the total light. The amount of quinone reduced under the effect of ultraviolet light is determined and compared with the analytical curve of ultraviolet light measured in advance. Thus, the received amount of ultraviolet light can be detected. As understood from the foregoing description, in the method of measuring ultraviolet light according to this invention, the received amount of ultraviolet light can be accurately measured in proportion to time, and therefore, unlike in the conventional Brillouin spectrophotometer, the amount of ultraviolet light received for a long time, say, one day can be accurately measured.

The degree to which the ultraviolet light is cut off by the ultravioletless light transmission plate 16' depends on the material of the particular ultravioletless light transmission plate 16'. In the case of a material low in cutting rate, it is proper to determine the difference of the reduction current value between the case in which the ultraviolet light is cut off by the ultravioletless light transmission plate 16' and the case in which the ultraviolet light is transmitted through the total light transmission plate 16, and this difference value is converted to the figure which should be obtained in the case where 100% of ultraviolet light is cut off in accordance with the cutting rate, i.e. the material of the ultravioletless light transmission plate 16'.

According to the first embodiment, the solution of the same composition described above is used as the coexistent electrolyte solutions D, D' of the total light received amount detection unit A and the ultravioletless light received amount detection unit B, and 3-methyl-p-benzoquinone is used as quinone. In the total light received amount detection unit A, the total light transmission plate 16 arranged on the surface thereof transmits all the light rays including the ultraviolet light, and therefore, 3-methyl-p-benzoquinone is reduced in amount by being changed to 3-methyl-p-hydroxybenzoquinone by the transmitted ultraviolet light. At the same time, a similar change is caused by the other light rays (such as infrared light) and the ambient temperature, thereby further reducing the amount of 3-methyl-p-benzoquinone. In the ultravioletless light received amount detection unit B, on the other hand, the ultravioletless light transmission plate 16' cuts off the ultraviolet light, and therefore the effect of ultraviolet light on 3-methyl-p-benzoquinone is eliminated, so that 3-methyl-p-benzoquinone is reduced or decreased by being changed to 3-methyl-p-hydroxybenzoquinone under the effect of factors other than the ultraviolet light. In other words, the difference between the total light received amount detection unit A and the ultravioletless light received amount detection unit B is limited to the decrease in 3-methyl-p-benzoquinone due to the ultraviolet light.

With the decrease in 3-methyl-p-benzoquinone, and when the reduction potential of 3-methyl-p-benzoquinone is applied to the first working electrode 10 and the second working electrode 10', the respective reduction current is decreased as protons are absorbed by 3-methyl-p-benzoquinone in the neighborhood of the first working electrode 10 and the second working electrode 10'. The calculated difference of the measurement of the reduction current value of 3-methyl-p-benzoquinone between the total light received amount detection unit A and the ultravioletless light received amount detection unit B is equal to the difference of the reduction current value due to the ultraviolet light. The amount of ultraviolet light received can be measured by comparing the time during which ultraviolet light is received with the analytical curve indicating the reduced (decreased) amount of 3-methyl-p-benzoquinone measured for each strength of the ultraviolet light in advance. In the case where the ultravioletless light transmission plate 16' cannot cut off the ultraviolet light completely (100% cutting), it is corrected in accordance with the cutting rate of the ultravioletless light transmission plate 16'. In the case of the cutting rate of 90%, for example, the figure of the measured amount is increased 1.03 times.

According to the first embodiment, the potentials of the first working electrode 10 and the second working electrode 10' are swept in order to measure the reduction current. A voltage application method other than the sweeping type is also effective. These two application methods including the sweeping method will be described somewhat in more detail below.

Figure 4:
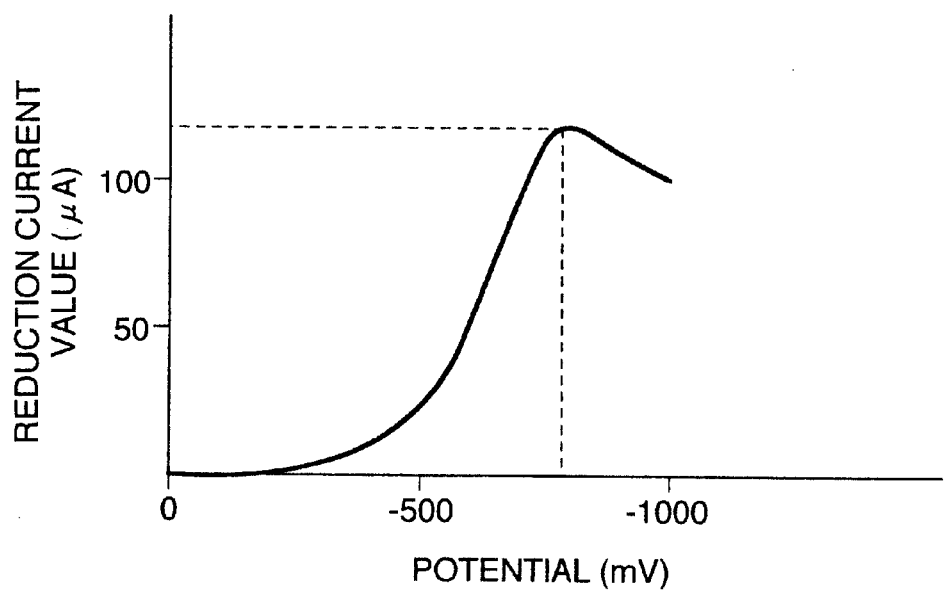
FIG. 4 is a diagram for explaining the reduction current appearing at the time of voltammetry.

In one application method described in the first embodiment, the potentials of the first working electrode 10 and the second working electrode 10' are swept in the range of, say, +800 mV to −1000 mV with respect to the reference electrode 12. The sweeping voltage range is selected in a manner not to be affected by the dissolved oxygen, and care must be used that the voltage range is also dependent on the type of each electrode and quinone. This method is called the voltammetry. FIG. 4 is a diagram for explaining the reduction current appearing at the time of voltammetry. As shown in FIG. 4, in the case of voltammetry, the peak value of the reduction current appearing in the potential-reduction current characteristic curve (voltammogram) obtained as the result of sweeping is measured. The sweeping rate is appropriately set in a range of from 10 mV/s to 200 mV/s in order that the electrode reaction may be set to the controlled rate of or in association with electron movement velocity.

Figure 5:
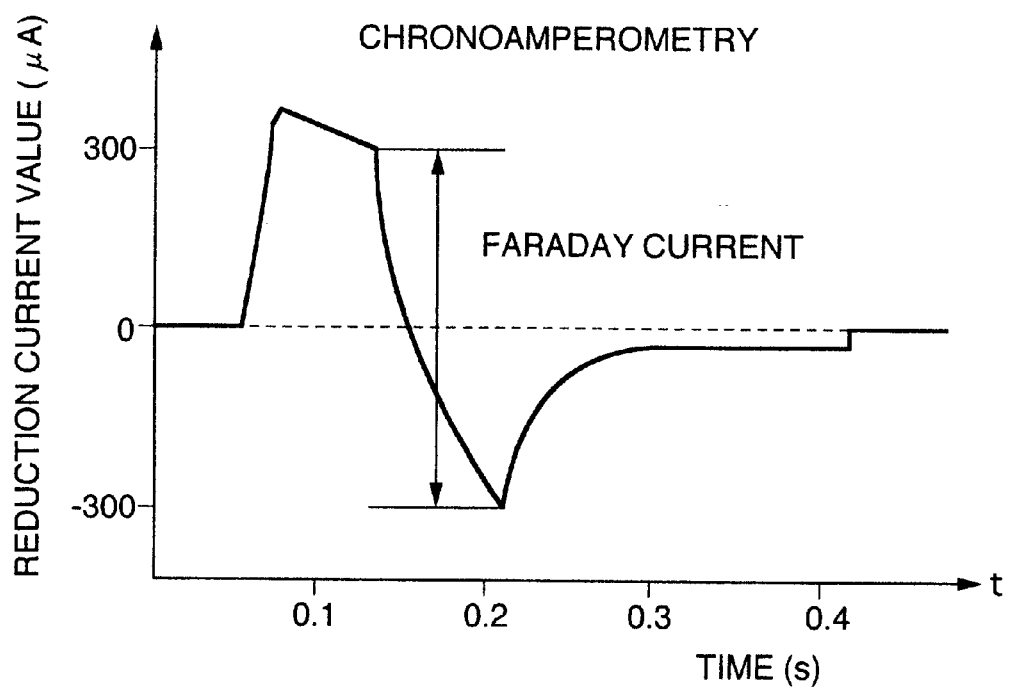
FIG. 5 is a diagram for explaining the Faraday current appearing at the time of chronoamperometry.

In a second sweep-voltage application method, a pulsed or stepped reduction potential of 3-methyl-p-benzoquinone is applied from the first working electrode 10 and the second working electrode 10' with respect to the reference electrode 12. Depending on the type of quinone, quinone is properly selected in such a manner that the reduction potential is in the range of about −200 mV to −1000 mV in view of the absorption of ultraviolet light. This voltage range is free of the effect of the dissolved oxygen. This range is somewhat changed in the case where the first working electrode 10 or the second working electrode 10' is made of other than the carbon material described above. This application method is called the chronoamperometry. The chronoamperometry forms an electrical double layer on the surface of the first working electrode 10 or the second working electrode 10', and has the phenomenon that quinone is converted into anions and deprives the solvent of protons in the neighborhood of the electrodes. The 3-methyl-p-benzoquinone used in this first embodiment is reduced by the movement of electrons into a hydroxide and becomes 3-methyl-p-hydroxybenzoquinone. The reduction current that flows abruptly in the process is called the Faraday current. Since the Faraday current is proportional to the amount of 3-methyl-p-benzoquinone, the amount of 3-methyl-p-benzoquinone can be measured by measuring the Faraday current value. FIG. 5 is a diagram for explaining the Faraday current appearing at the time of chronoamperometry.

The ultraviolet light sensor and the measuring chip in the first embodiment calculates the amount of ultraviolet light by measuring the reduction current according to the aforementioned electrochemical method and displays the radiated amount of ultraviolet light on the display unit. A specific control circuit and the operation will be explained.

Figure 6:
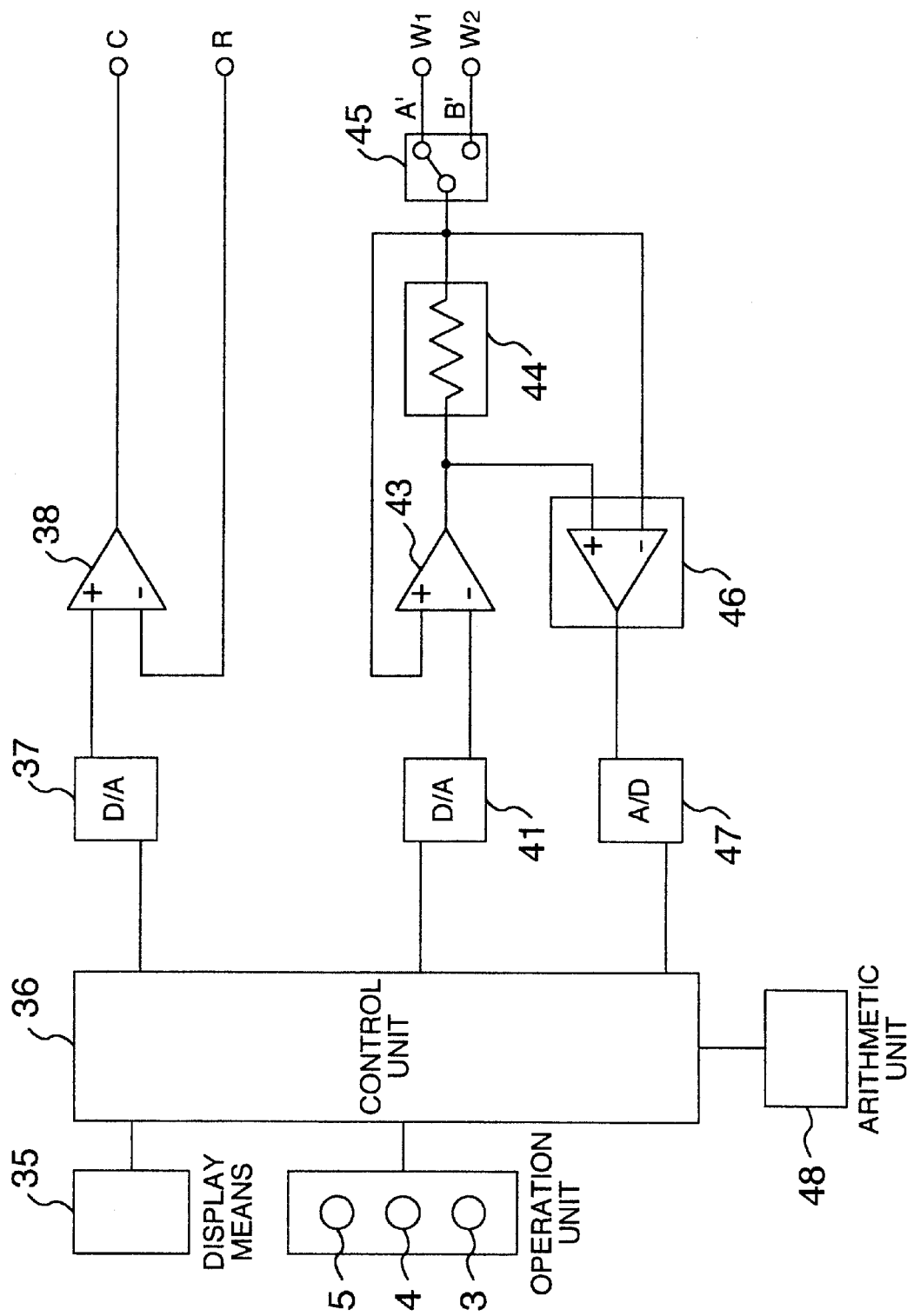
FIG. 6 is a diagram showing a control circuit of the ultraviolet light sensor according to the first embodiment of the invention.

First, the measuring chip C for measuring the received ultraviolet light amount is mounted on a part of the human body in such a position that the first light transmission window 13 of the total light received amount detection unit A and the second transmission window 13' of the ultravioletless received amount detection unit B are directed toward the sun. After exposure to the sunlight for a predetermined length of time, the measuring chip C is removed from the body and inserted into the measuring chip insertion unit 6 of the system body 1. As a result, each electrode and the control circuit in the system body 1 are electrically connected to each other. The power button 5 is depressed to energize the ultraviolet light sensor. Further, the start button 3 is depressed to start the measurement. FIG. 6 is a diagram showing a circuit control of the ultraviolet light sensor according to the first embodiment. In FIG. 6, numeral 35 designates a LCD constituting a display unit 2. Numeral 36 designates a control unit for controlling the ultraviolet light sensor and configured with a microcomputer and a memory. The control unit 36 performs the control operation to apply a predetermined potential to each electrode of the measuring chip C while at the same time controlling the LCD 35, so that the arithmetic unit 48 described later is caused to calculate the amount of ultraviolet light from the peak value of the reduction current measured in each of the total light received amount detection unit A and the ultravioletless light received amount detection unit B.

Once the power button 5 and the start button 3 are depressed, the control unit 36 turns on the switch in the corresponding circuit thereby making the ultraviolet light sensor ready for operation. The control unit 36 first causes the total light received amount detection unit A to start the detection of the amount of the received light, and upon completion of this operation, instructs the ultravioletless received light amount detection unit B to detect the received amount of the light with the ultraviolet light thereof cut off.

Numeral 37 designates a D/A converter for converting to an analog signal the data output by the control unit 36 for applying a predetermined potential to the reference electrode 12 (indicated by "R" in FIG. 6) and the counter electrode 11 (indicated by "C" in FIG. 6), and numeral 38 an operational amplifier for applying a predetermined potential to the counter electrode 11. Numeral 41 designates a D/A converter for converting into an analog signal the data output by the control unit 36 for applying a predetermined potential to the first working electrode 10 and the second working electrode 10' to measure the reduction current, numeral 43 an operational amplifier for applying a predetermined potential to the first working electrode 10 and the second working electrode 10' to measure the reduction current, numeral 44 a resistor for measuring the current flowing between the first working electrode 10 and the counter electrode 11 and between the second working electrode 10' and the counter electrode 11, and numeral 45 a relay for switching between the first working electrode 10 (indicated by "W1" in FIG. 6) and the second working electrode 10' (indicated by "W2" in FIG. 6). Numeral 46 designates a voltage amplifier which is supplied with the drop voltage generated across the resistor 44 and amplifies and outputs it through a differential amplifier circuit configured with an operational amplifier, and numeral 47 an A/D converter for converting the voltage amplified by the voltage amplifier 46 into data and applying it to the control unit 36. The resistor 44 and the voltage amplifier 46 make up a detection unit according to the first embodiment. According to the first embodiment, the first detection unit for detecting the current flowing between the first working electrode 10 and the counter electrode 11 and the second detection unit for detecting the current between the second working electrode 10' and the counter electrode 11 can double as each other by switching the relay 45, and thus the circuit is simplified. In similar fashion, according to the first embodiment, the output voltages of the D/A converters 37, 41 can be made variable by the data from the control unit 36, and therefore the voltage between the first working electrode 10 and the counter electrode 11 and the voltage between the second working electrode 10' and the counter electrode 11 can be either equalized to each other or differentiated from each other.

The control unit 36 stores the detected data in an internal memory as a current value flowing between the first working electrode 10 and the counter electrode 11 and between the second working electrode 10' and the counter electrode 11. Numeral 48 designates an arithmetic unit which determines the difference of the reduction current value measurement between the total light received amount detection unit A and the ultravioletless received light amount detection unit B, and by comparing the difference with the analytical curve data of the ultraviolet light stored in memory, calculates the received amount of ultraviolet light by interpolation.

Now, the operation of the control circuit according to the first embodiment will be explained. The measuring chip C is inserted into the measuring chip insertion unit 6 of the system body 1 and the power button 5 is depressed to activate the measuring chip C. Further, the start button 3 is depressed for starting the measurement. The control unit 36 turns on each switch of the corresponding control circuit and renders the ultraviolet light sensor ready for operation. Then, the control unit 36 instructs the total light received amount detection unit A to start the detection of the received light amount. In order to measure the reduction current value of the 3-methyl-p-benzoquinone due to the total light rays (sunlight) containing the ultraviolet light, the control unit 36 connects the relay 45 to A' side in view of the need to energize the first working electrode 10, the counter electrode 11 and the reference electrode 12. After that, the control unit 36 reads the data for the reference electrode 12 from the memory, and converting it into an analog signal by the D/A converter 37, outputs it to the operational amplifier 38. The operational amplifier 38 controls the potential applied to the counter electrode 11 in such a manner as to secure a reference voltage of the reference electrode conforming with the data using its imaginary shortcircuiting. At the same time, the control unit 36 reads the data for the first working electrode 10 from the memory, and after converting it into an analog signal through the D/A converter 41, outputs it to the operational amplifier 43. The operational amplifier 43 constitutes a follower in order to prevent the voltage drop across the current-detecting resistor 44 from changing the potential of the first working electrode 10 on the output side. As a result, the first working electrode 10 is controlled at a predetermined potential conforming with the data.

According to the first embodiment, the voltmmetry is carried out for detecting the light radiation amount of the total light received amount detection unit A, and therefore the control unit 36 sweeps the potential of the first working electrode 10 at the rate of 10 mV/s to 200 mV/s in the range of +800 mv to −1000 mV. The counter electrode 11 is supplied, by the imaginary shortcircuiting of the operational amplifier 38, with such a potential that the first working electrode 10 is set to a predetermined sweeping potential with reference to the potential of the reference electrode 12. In the process, the value of the reduction current flowing in the first working electrode 10 is detected as the voltage drop across the resistor 44, and the detected voltage is amplified by the voltage amplifier unit 46 and converted into data through the A/D converter 47, to be applied to the control unit 36. Among the data of the current value making up the voltammogram, the control unit 36 selects the data which becomes the peak value and stores it. The selected data is the degeneration data for 3-methyl-p-benzoquinone of the total light received amount detection unit A.

Then, the control unit 36 instructs the ultravioletless light received amount detection unit B to detect the received amount of the light from which ultraviolet light is cut off. The ultravioletless received light amount detection unit B also detects the received light amount in a similar manner to the total light received amount detection unit A described above. In order to measure the reduction current value of the 3-methyl-p-benzoquinone due to the light rays with the ultraviolet light cut off, the control unit 36 connects the relay 45 to B' side in view of the need to energize or feed the second working electrode 10', the counter electrode 11 and the reference electrode 12. After that, the control unit 36 reads the data for the reference electrode 12 from the memory, and converting it into an analog signal by the D/A converter 37 to output to the operational amplifier 38. The operational amplifier 38 controls, by its imaginary shortcircuiting, the potential applied to the counter electrode 11 in such a manner as to secure a reference voltage of the reference electrode conforming with the data. At the same time, the control unit 36 reads the data for the second working electrode 10' from the memory, and after converting it into an analog signal through the D/A converter 41 to output to the operational amplifier 43. The operational amplifier 43 constitutes a follower in order to prevent the voltage drop across the current-detecting resistor 44 from changing the potential of the second working electrode 10' on the output side. As a result, the second working electrode 10' is controlled at a predetermined potential conforming with the data. The control unit 36 sweeps the potential of the second working electrode 10' at the rate of 10 mV/s to 200 mV/s in the range of +800 mV to −1000 mV. The counter electrode 11 is supplied, by the imaginary shortcircuiting of the operational amplifier 38, with such a potential that the second working electrode 10' is set to a sweeping potential with reference to the potential of the reference electrode 12. In the process, the value of the reduction current flowing in the second working electrode 10' is detected as the voltage drop across the resistor 44, and after amplification at the voltage amplifier unit 46 and conversion into data through the A/D converter 47, is applied to the control unit 36. Among the data of the current value making up the voltammogram, the control unit 36 selects the data which becomes the peak value and stores it. The selected data is the degeneration data for 3-methyl-p-benzoquinone of the ultravioletless received amount detection unit B.

Upon acquisition by the control unit 36 of the degeneration data for the 3-methyl-p-benzoquinone of the total light received amount detection unit A and the degeneration data for 3-methyl-p-benzoquinone of the ultravioletless received amount detection unit B, the arithmetic unit 48 calculates the ultraviolet light received amount by comparing the data with the analytical curve of the ultraviolet light stored in memory.

According to the first embodiment, the control unit 36 determines the peak value of the reduction current by voltammetry of the amount of ultraviolet light. As an alternative, the amount of the received ultraviolet light can be calculated by measuring the Faraday current by chrono-amperometry. In such a case, the control unit 36 sets the relay 45 to the A' contact point, and applies a pulse-shaped or stepped voltage to the first working electrode 10. In the process, the value of the reduction current flowing in the first working electrode 10 is detected by the resistor 44, and after conversion to data through the voltage amplifier unit 46 and the A/D converter 47, is applied to the control unit 36. The control unit 36 stores by selecting the data considered to be the Faraday current from the data of the current value. Then, the control unit 36 switches the relay 45 to the B' contact point and applies a pulse-shaped or stepped voltage to the second working electrode 10'. The value of the reduction current flowing in the process is detected by the resistor 44, and after conversion into data through the voltage amplifier unit 46 and the A/D converter 47, is applied to the control unit 36. The control unit 36 stores by selecting the data considered as the Faraday current from the data of the current value. The arithmetic unit 48 can calculate the amount of ultraviolet light by comparing the radiation amount of ultraviolet light stored in advance with the analytical curve.

In this way, the ultraviolet light sensor according to the first embodiment measures the radiation amount of the total light rays by voltammetry, while at the same time measuring the radiation amount of the light with the ultraviolet light removed therefrom to determine the difference between the two radiation amounts. Thus the amount of ultraviolet light radiated on the measuring chip can be calculated. Also, chronoamperometry shortens the time for measuring the amount of the ultraviolet light radiated on the measuring chip.

(Second Embodiment)

A second embodiment of the invention will be explained below with reference to FIGS. 7 to 12.

Figure 7:
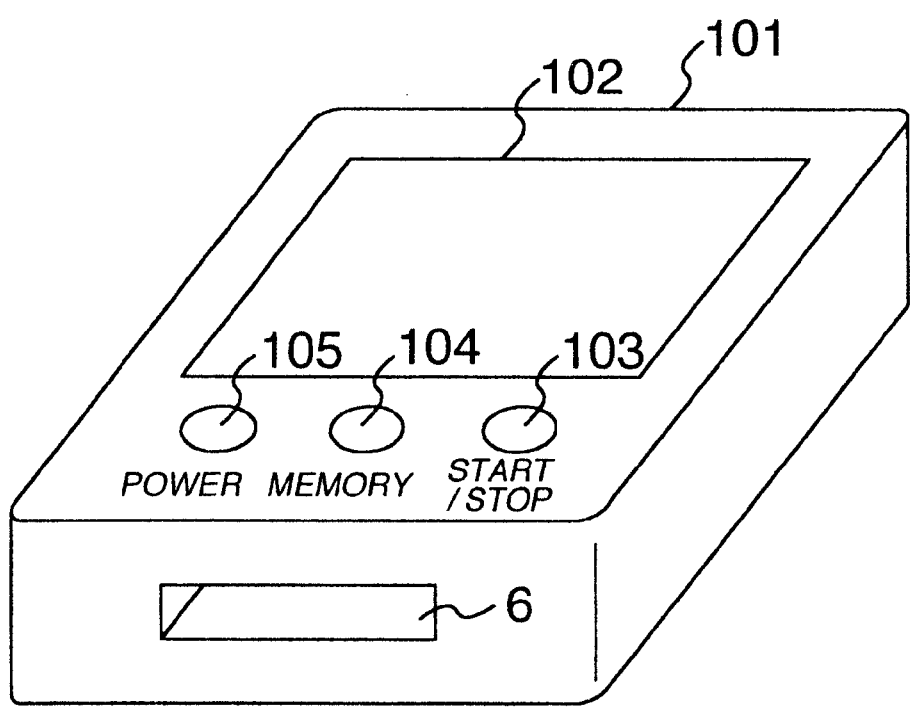
FIG. 7 schematically shows an outer appearance of the ultraviolet light sensor according to the second embodiment of the invention.

First, an ultraviolet light sensor and an ultraviolet light measuring chip according to another embodiment of the invention will be explained in detail with reference to the drawings. FIG. 7 is a diagram showing the outer appearance of the ultraviolet light sensor according to the second embodiment. In FIG. 7, numeral 101 designates a system body, numeral 102 a display unit for displaying by converting the measurement into the amount of ultraviolet light, numeral 103 a start/stop button for starting the measurement, numeral 104 a mode switch button for accessing the stored data or switching the various modes, numeral 105 a power button for turning on/off the power, and numeral 106 a measuring chip insertion unit into which the ultraviolet light measuring chip G (hereinafter sometimes referred to as the measuring chip) is inserted and by thus connecting electrically, the amount of ultraviolet light is measured after receiving the ultraviolet light by the measuring chip G described later. The measuring chip insertion unit 106 has therein a connector terminal (not shown) that can be connected to the terminal of the measuring chip G.

Figure 8:
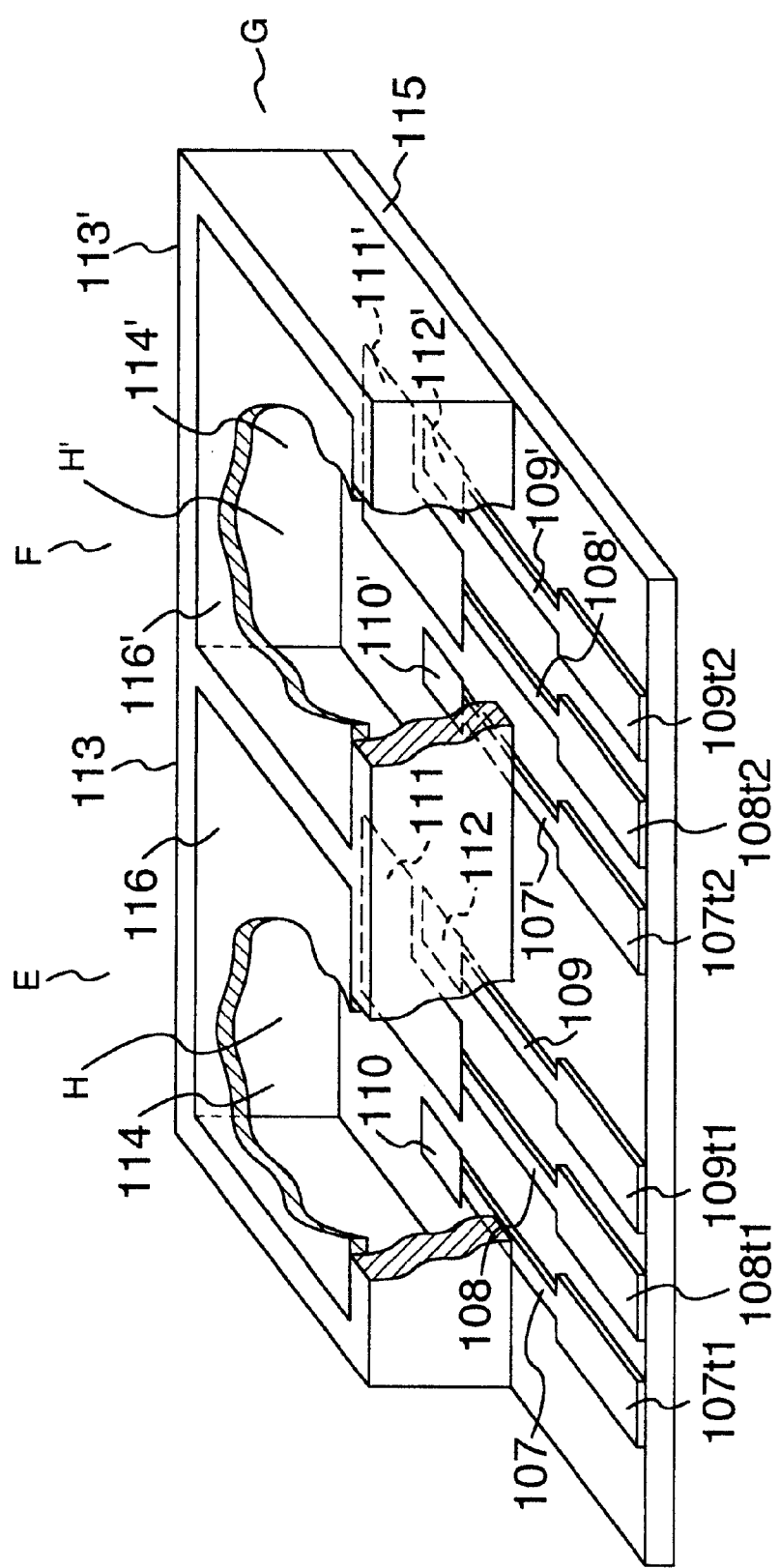
FIG. 8 is a diagram for explaining the ultraviolet light measuring chip of the ultraviolet light sensor according to the second embodiment of the invention.

FIG. 8 is a diagram for explaining the ultraviolet light measuring chip of the ultraviolet light sensor according to the second embodiment of the invention. Numeral 107 designates a first working electrode pattern, numeral 107' a second working electrode pattern, numeral 108 a first counter electrode pattern, numeral 108' a second counter electrode pattern, numeral 109 a first reference electrode pattern, numeral 109' a second reference electrode pattern, numeral 110 a first working electrode, numeral 110' a second working electrode, numeral 111 a first counter electrode, numeral 111' a second counter electrode, 112 a first reference electrode, and numeral 112' a second reference electrode. Reference character 107t1 designates a terminal of the first working electrode, character 107t2 a terminal of the second working electrode, character 108t1 a terminal of the first counter electrode, character 108t2 a terminal of the second counter electrode, character 109t1 a terminal of the first reference electrode, and character 109t2 a terminal of the second reference electrode. Numeral 115 designates a base board.

The first working electrode pattern 107 is a thin from strip formed by screen printing a conductive carbon paste containing a resin binder on the base board 115. The first working electrode pattern 107 is connected to the first working electrode 110. The first working electrode 110 is configured of a thin film of a carbon electrode called glassy carbon, a thin film of a carbon material formed by forming a plastic called PFC (plastic formed carbon) sintering it at 1000° C. to 2000° C., or a thin film formed by depositing by evaporation or sputtering gold. The second working electrode 110' is also made in quite the same way preferably. Instead of making the first working electrode 110 and the first working electrode pattern 107 separately from each other as described above, the fabrication steps and cost can be desirably reduced by screen printing the first working electrode 110 integrally with the first working electrode pattern 107 into a thin film using a conductive carbon paste. This integral forming process for the first working electrode 110 is also preferably applicable similarly to the second working electrode 110'.

Then, the first counter electrode pattern 108 is formed as a thin film strip by screen printing the conductive carbon paste containing a resin binder on the base board 115. The first counter electrode pattern 108 is connected to the first counter electrode 111. The first counter electrode 111 is configured with a conductive material such as platinum, graphite, gold, stainless steel or aluminum. The second counter electrode 111' is also properly configured in exactly the same way as the first counter electrode 111. Like the first working electrode 110 and the first working electrode pattern 107, the first counter electrode 111 is also preferably configured not separately from but integrally with the first counter electrode pattern 108 using the conductive carbon paste to reduce the fabrication steps and the cost. The second counter electrode 111' is also properly configured in exactly the same way as the first counter electrode 111.

Further, the first reference electrode pattern 109 is formed as a thin film strip by screen printing the conductive carbon paste containing a resin binder on the base board 115. The first reference electrode pattern 109 is connected to the first reference electrode 112. The first reference electrode 112 is configured as a thin film of a carbon electrode made of a material called glassy carbon, a thin film a carbon material formed by sintering a plastic called PFC at 1000° C. to 2000° C., or a thin film formed by depositing by evaporation or sputtering gold. This process is similarly applicable to the second reference electrode pattern 109' and the second reference electrode 112'.

The terminal 107t1 of the first working electrode, the terminal 108t1 of the first counter electrode, the terminal 109t1 of the first reference electrode, the terminal 107t2 of the second working electrode, the terminal 108t2 of the second counter electrode and the terminal 109t2 of the second reference electrode are preferably reinforced by making them of a conductive material such as platinum, gold, stainless steel or the like in order to increase the contact strength of the connector and make electrical connection small in resistance.

In FIG. 8, numeral 113 designates a first light transmission window, numeral 113' a second light transmission window, numeral 114 a first reaction chamber, numeral 114' a second reaction chamber, numeral 116 a total light transmission plate, and numeral 116' an ultravioletless light transmission plate. The first light transmission window 113 for transmitting the total light is opened to the surface of the first reaction chamber 114, and the total light transmission plate 116 is mounted on the first light transmission window 113. In similar fashion, the second light transmission window 113' for transmitting the light from which only the ultraviolet light is cut off is opened to the surface of the second reaction chamber 114', and the ultravioletless light transmission plate 116' is mounted on the second light transmission window 113.

The first working electrode 110, the first counter electrode 111 and the first reference electrode 112 are arranged out of contact with each other in the first reaction chamber 114, and are led out by the first working electrode pattern 107, the first counter electrode pattern 108 and the first reference electrode pattern 109, respectively. The terminal portions of the first working electrode pattern 107, the first counter electrode pattern 108 and the first reference electrode pattern 109 thus led out constitute the terminal 107t1 of the first working electrode, the terminal 108t1 of the first counter electrode and the terminal 109t1 of the first reference electrode, respectively, and electrically connected when mounted in the measuring chip insertion unit 106. An insulating material is covered on the surfaces of the first working electrode pattern 107, the first counter electrode pattern 108 and the first reference electrode pattern 109 with the exception of the electrode portions of the first working electrode pattern 110, the first counter electrode 111 and the first reference electrode 112 and the terminal portions of the terminal 107t1 of the first working electrode, the terminal 108t1 of the first counter electrode and the terminal 109t1 of the first reference electrode.

In similar fashion, the second working electrode 110', the second counter electrode 111' and the second reference electrode 112' are arranged out of contact with each other in the second reaction chamber 114', and led out by the second working electrode pattern 107', the second counter electrode pattern 108' and the second reference electrode pattern 109', respectively. The terminals of the second working electrode pattern 107', the second counter electrode pattern 108' and the second reference electrode pattern 109' thus led out constitute the terminal 107t2 of the second working electrode, the terminal 108t2 of the second counter electrode and the terminal 109t2 of the second reference electrode, respectively, and electrically connected when mounted in the measuring chip insertion unit 106. The surfaces of the second electrode pattern 107', the second counter electrode pattern 108' and the second reference electrode pattern 109' are covered with an insulating material with the exception of the electrode portions of the second working electrode 110', the second counter electrode 111' and the second reference electrode 112' and the terminal portions of the terminal 107t2 of the second working electrode, the terminal 108t2 of the second counter electrode and the terminal 109t2 of the second reference electrode.

According to this embodiment, the first working electrode pattern 107, the first counter electrode pattern 108, the first reference electrode pattern 109, the second working electrode pattern 107', the second counter electrode pattern 108' and the second reference electrode pattern 109' are led out in parallel. Also, the terminal 107t1 of the first working electrode, the terminal 108t1 of the first counter electrode and the terminal 109t1 of the first reference electrode, the terminal 107t2 of the second working electrode, the terminal 108t2 of the second counter electrode and the terminal 109t2 of the second reference electrode constituting the terminal portions are arranged in parallel to each other at substantially equal pitches. As a result, the measuring chip can be made compact and electrically connected with the connector terminal in the measuring chip insertion unit 6.

The first reaction chamber 114 and the second reaction chamber 114' according to this embodiment accommodate or hold therein a coexistent electrolyte solution H and a coexistent electrolyte solution H', respectively, for measuring the received light amount electrochemically. The coexistent electrolyte solution H and the coexistent electrolyte solution H' have the same components including quinone solved in an organic solvent such as ethanol or isopropyl alcohol, to which an electrolyte such as sodium chloride or lithium chloride is added. Examples of quinone used include p-benzoquinone, 3-methyl-p-benzoquinone, o-benzoquinone, diphenoquinone, naphthoquinone, anthraquinone, benzene azohydroquinone and derivatives of them. They also include quinone groups. According to the second embodiment, the coexistent electrolyte solutions H, H' are so composed specifically that 20 mM of 3-methyl-p-benzoquinone and 150 mM of sodium chloride are dissolved in a mixture solvent of ethanol and water in the ratio of 8 to 2.

The total light transmission plate 116 is mounted in the first reaction chamber 114 accommodating the coexistent electrolyte solution H. The total light transmission plate 116 preferably is properly made of quartz glass, diamond, single crystal of sodium chloride or titania having the ultraviolet light transmittance of 99%. On the other hand, the ultravioletless light transmission plate 116' is mounted in the second reaction chamber 114' accommodating the coexistent electrolyte solution H'. This ultravioletless light transmission plate 116' is made of such a resin as vinyl chloride resin, acrylic resin, polycarbonate resin or methacrylic resin which are ransparent and cut off at least 90% of the ultraiolet light and transmit other light rays such as infrared light, or ordinary glass covered with an ultraviolet light cutting filter having the surface thereof specially treated with mild vinyl film, polyurethane film, polyester film or the like.

In this way, the first light transmission window 113 is arranged and the total light transmission plate 116 is fitted in the first reaction chamber 114 accommodating the coexistent electrolyte solution H, in which the first working electrode 110, the first counter electrode 111 and the first reference electrode 112 are immersed out of contact with each other. These component parts make up a total received light detection unit E of the measuring chip G according to the second embodiment. In similar fashion, the second reaction chamber 114' has the second light transmission window 113' and has fitted therein the ultravioletless light transmission plate 116'. Also, the second reaction chamber 114' accommodates the coexistent electrolyte solution H', in which the second working electrode 110', the second counter electrode 111' and the second reference electrode 112' are similarly immersed out of contact with each other. These component parts make up an ultravioletless received light detection unit F of the measuring chip G according to the second embodiment.

In the measuring chip G, the total light received amount detection unit E and the ultravioletless received light amount detection unit F are arranged in great proximity to each other in order to secure the same effect on quinone except for the effect of ultraviolet light. Also, in order to secure the same degree of degeneration of quinone except for the ultraviolet light, the coexistent electrolyte solutions H, H' are such that the total light received amount detection unit E and the ultravioletless light received amount detection unit F are made of the same electrode material and the same electrode pattern material. In this way, the coexistent electrolyte solutions of the same composition are properly used under the same environmental conditions.

Figure 9:
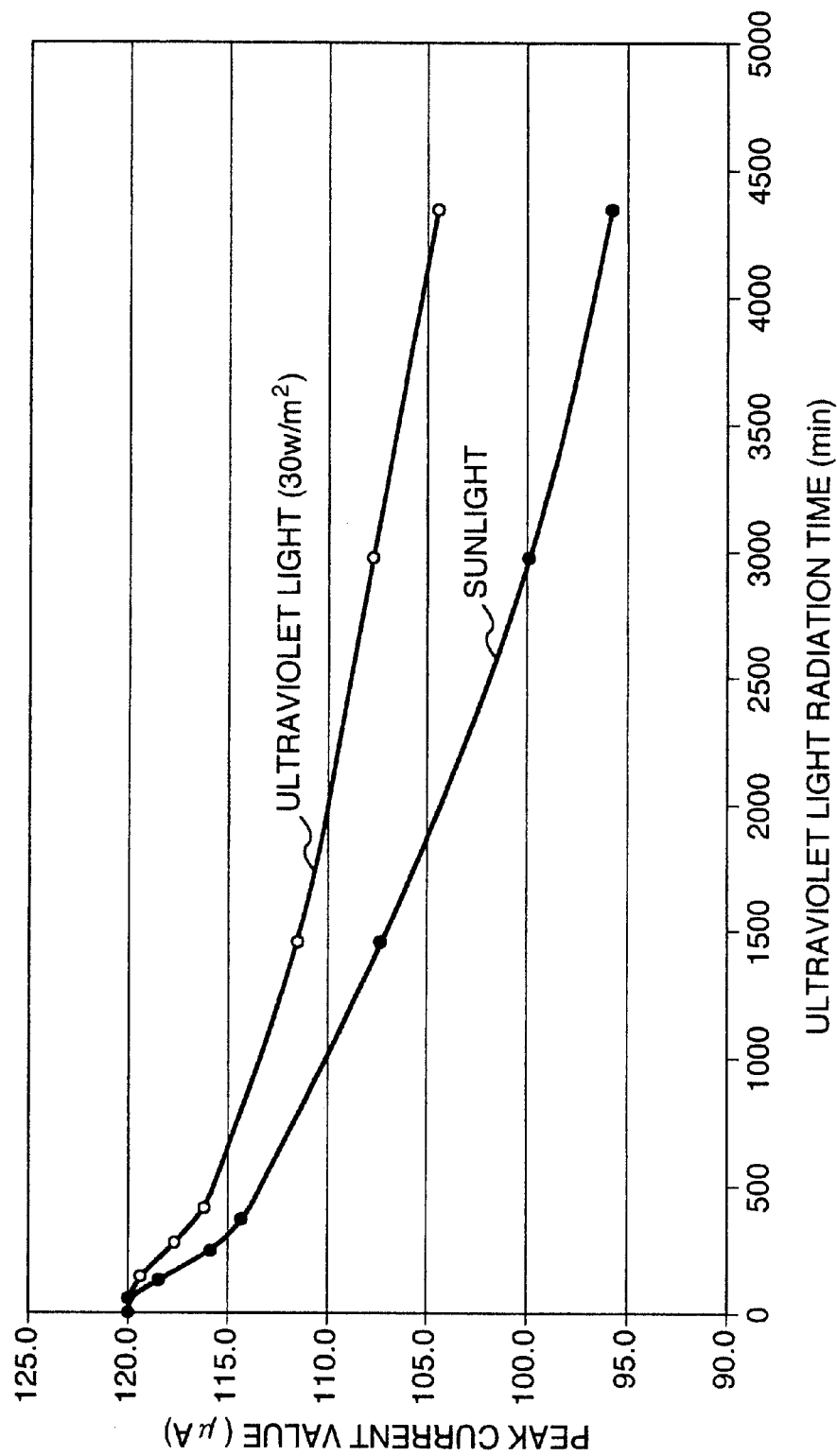
FIG. 9 is a graph showing the relation between the time during which light is radiated on the coexistent electrolyte solution containing quinone and the peak value of the quinone reduction current.

Now, an explanation will be given of the reason why the amount of ultraviolet light can be detected by the measuring chip G according to the second embodiment. FIG. 9 is a graph showing the relation between the radiation time of light on the coexistent electrolyte solutions containing quinone and the peak value of the quinone reduction current. Quinone is 3-methyl-p-benzoquinone, and the sunlight corresponding to the total light rays and the ultraviolet light of 30 W/m$^2$ is radiated. The measurement conditions involved are that the working electrodes and the reference electrodes are made of glassy carbon and the counter electrodes of platinum, the working electrodes have an area of 3.2 mm$^2$, and the coexistent electrolyte solutions are a mixture of 20 mM of 3-methyl-p-benzoquinone, 150 mM of sodium chloride and an 8-to-2 ethanol-water (8:2) mixture. A voltage is applied between the working electrodes and the counter electrodes in such a manner that the working electrodes are at the sweeping potential based on the potential of the reference electrodes, and the reduction current having a peak at the reduction potential of 3-methyl-p-benzoquinone is obtained by sweeping at the rate of 100 mV/sec. As described later, the reduction current value may alternatively be obtained by applying a predetermined voltage and measuring the Faraday current instead of by sweeping. As shown in FIG. 9, both in the case where ultraviolet light is received and in the case where the total sunlight is received, an increased receiving time reduces the peak value of the quinone reduction current correspondingly. Thus, the ultraviolet light of known strength is radiated on the measuring chip, whereby the coexistent electrolyte solution with a reduced amount of 3-methyl-p-benzoquinone is electrochemically measured to produce an analytical curve with the light receiving time and the strength of ultraviolet light as variables. Thus, the amount of ultraviolet light that the measuring chip has received can be determined simply by measuring the amount of 3-methyl-p-benzoquinone.

However, the degeneration of quinone is affected not by light alone. The ambient temperature and other factors than light have also a great effect on quinone degeneration. In view of this, according to this invention, the coexistent electrolyte solution exposed to light with ultraviolet light cut off and the coexistent electrolyte solution exposed to the same conditions as the first coexistent electrolyte solution without cutting off the ultraviolet light are serially measured substantially at the same time. The conditions are exactly the same for the two electrolyte solutions except for the absence of ultraviolet light. Once the amount of quinone in the two coexistent electrolyte solutions is measured, therefore, the amount of quinone reduced in the coexistent electrolyte solution exposed to ultraviolet light is seen to be proportional to the received amount of ultraviolet light. In this way, the difference is determined between the coexistent electrolyte solution measured with ultraviolet light cut off and the coexistent electrolyte solution measured by being exposed to the total light, so that the received amount of ultraviolet light can be detected by determining the amount of quinone reduced under the effect of ultraviolet light and comparing it with the analytical curve of ultraviolet light measured in advance. As understood from the foregoing description, in the method of measuring ultraviolet light according to this invention, the received amount of ultraviolet light can be accurately measured in proportion to time, and therefore, unlike in the conventional Brillouin spectrophotometer, the amount of ultraviolet light received for a long time, say, one day can be accurately measured.

The degree to which the ultraviolet light is cut off by the ultravioletless light transmission plate 116' depends on the material of the particular ultravioletless light transmission plate 116'. In the case of a material low in cutting rate, the difference of the reduction current value is determined between the case in which the ultraviolet light is cut off by the ultravioletless transmission plate 116' and the case in which the ultraviolet light is transmitted through the total light transmission plate 116, and the difference value is converted to the figure for the case in which 100% of ultraviolet light is cut off in accordance with the cutting rate, i.e. the material of the ultravioletless light transmission plate 116'.

According to the second embodiment, the solution of the same composition as described above is used for the coexistent electrolyte solutions H, H' of the total light received amount detection unit E and the ultravioletless received light amount detection unit F, and 3-methyl-p-benzoquinone is used as quinone. In the total light received amount detection unit E, the total light transmission plate 116 arranged on the surface thereof transmits all the light rays including the ultraviolet light and therefore, 3-methyl-p-benzoquinone is reduced in amount by being changed to 3-methyl-p-hydroxybenzoquinone by the transmitted ultraviolet light. At the same time, a similar change is caused by the other light rays (such as infrared light) and the ambient temperature, thereby further reducing the amount of 3-methyl-p-benzoquinone. In the ultravioletless light received amount detection unit F, on the other hand, the ultravioletless light transmission plate 116' cuts off the ultraviolet light and therefore the effect of ultraviolet light on 3-methyl-p-benzoquinone is eliminated so that 3-methyl-p-benzoquinone is reduced by being changed to 3-methyl-p-hydroxybenzoquinone under the effect of factors other than the ultraviolet light. In other words, the difference between the total light received amount detection unit E and the ultravioletless light received amount detection unit F is limited to the decrease in 3-methyl-p-benzoquinone due to the ultraviolet light.

A decrease in 3-methyl-p-benzoquinone decreases the reduction current which flows with protons absorbed by 3-methyl-p-benzoquinone in the neighborhood of the first working electrode 110 and the second working electrode 110' when the reduction potential of 3-methyl-p-benzoquinone is applied to the first working electrode 110 and the second working electrode 110'. By calculating the difference of the value of the reduction current measurement of 3-methyl-p-benzoquinone between the total light received amount detection unit E and the ultravioletless light received amount detection unit F, the difference of the reduction current value due to the ultraviolet light is obtained. The amount of ultraviolet light received can be measured by comparing the time during which ultraviolet light is received with the analytical curve indicating the reduced amount of 3-methyl-p-benzoquinone predetermined for each strength of the ultraviolet light. In the case where the ultravioletless light transmission plate 116' cannot cut off the ultraviolet light completely, it is corrected in accordance with the cutting rate of the ultravioletless light transmission plate 116'. For the cutting rate of 90%, for example, the figure is increased by 1.03 times.

According to the second embodiment, the potential of the first working electrode 110 and the second working electrode 110' is swept in order to measure the reduction current. A voltage application method of other type than the sweeping is also effective. These two application methods including the sweeping method will be described somewhat in more detail below.

Figure 10:
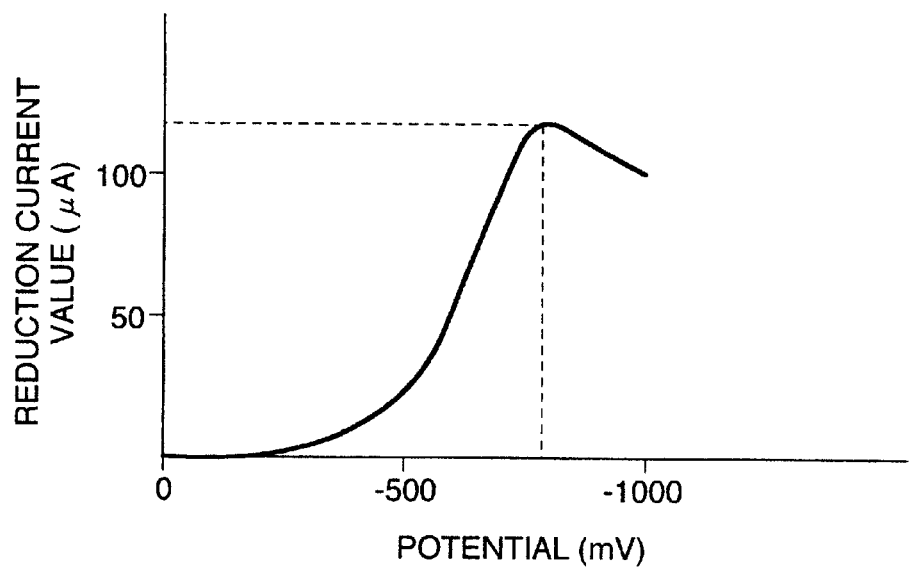
FIG. 10 is a diagram for explaining the reduction current appearing at the time of voltammetry.

In one application method described above in the second embodiment, the potential of the first counter electrode 111 or the second counter electrode 111' is swept in the range of, say, +800 mV to −1000 mV with respect to the first reference electrode 112 or the second reference electrode 112'. The sweeping voltage range is selected in a manner not to be affected by the dissolved oxygen, and care must be exercised that the voltage range is also changed depending on the type of each electrode and quinone. This method is called the voltammetry. FIG. 10 is a diagram for explaining the reduction current appearing at the time of voltammetry. As shown in FIG. 10, in the case of voltammetry, the peak value of the reduction current appearing in the potential-reduction current characteristic curve (voltammogram) obtained as the result of sweeping is measured. The sweeping rate is properly set to 10 mV/s to 200 mV/s in order that the electrode reaction may be set to the controlled rate of electron movement.

Figure 11:
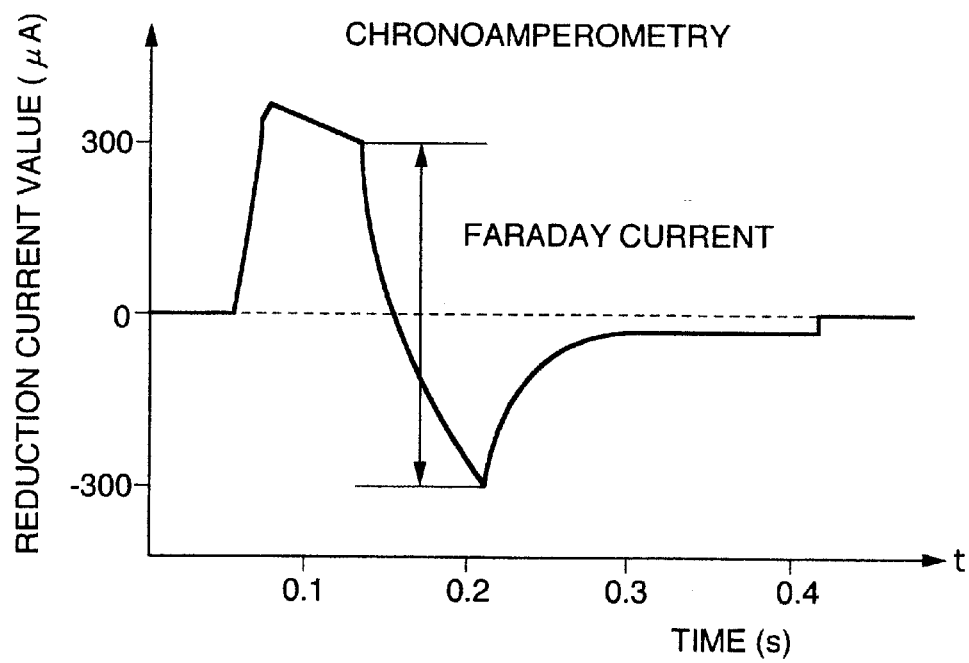
FIG. 11 is a diagram for explaining the Faraday current appearing at the time of chronoamperometry.

In a second application method, the reduction potential of 3-methyl-p-benzoquinone in pulse or stepped form may be applied from the first counter electrode 111 or the second counter electrode 111' to the first reference electrode 112 or the second reference electrode 112'. Depending on the type of quinone, quinone is properly selected in such a manner as to secure the range of about −200 mV to −1000 mV in view of the relation with the absorption of ultraviolet light. This voltage range is free of the effect of the dissolved oxygen. This range is somewhat changed in the case where the first working electrode 110 or the second working electrode 110' is made of other than the carbon material described above. This application method is called the chronoamperometry. The chronoamperometry forms an electrical double layer on the surface of the first working electrode 110 or the second working electrode 110', and causes the phenomenon that quinone is converted into anions and the solvent is deprived of protons in the neighborhood of the electrodes. The 3-methyl-p-benzoquinone used in this second embodiment is reduced by the movement of electrons into a hydroxide and becomes 3-methyl-p-hydroxybenzoquinone. The reduction current that flows suddenly in the process is called the Faraday current. Since the Faraday current is proportional to the amount of 3-methyl-p-benzoquinone, the amount of 3-methyl-p-benzoquinone can be measured by measuring the Faraday current value. FIG. 11 is a diagram for explaining the Faraday current appearing at the time of chronoamperometry.

The ultraviolet light sensor and the measuring chip according to the second embodiment calculate the amount of ultraviolet light by measuring the reduction current according to the aforementioned electrochemical method and displaying the radiated amount of ultraviolet light on the display unit. A specific control circuit and the operation for this process will be explained.

Figure 12:
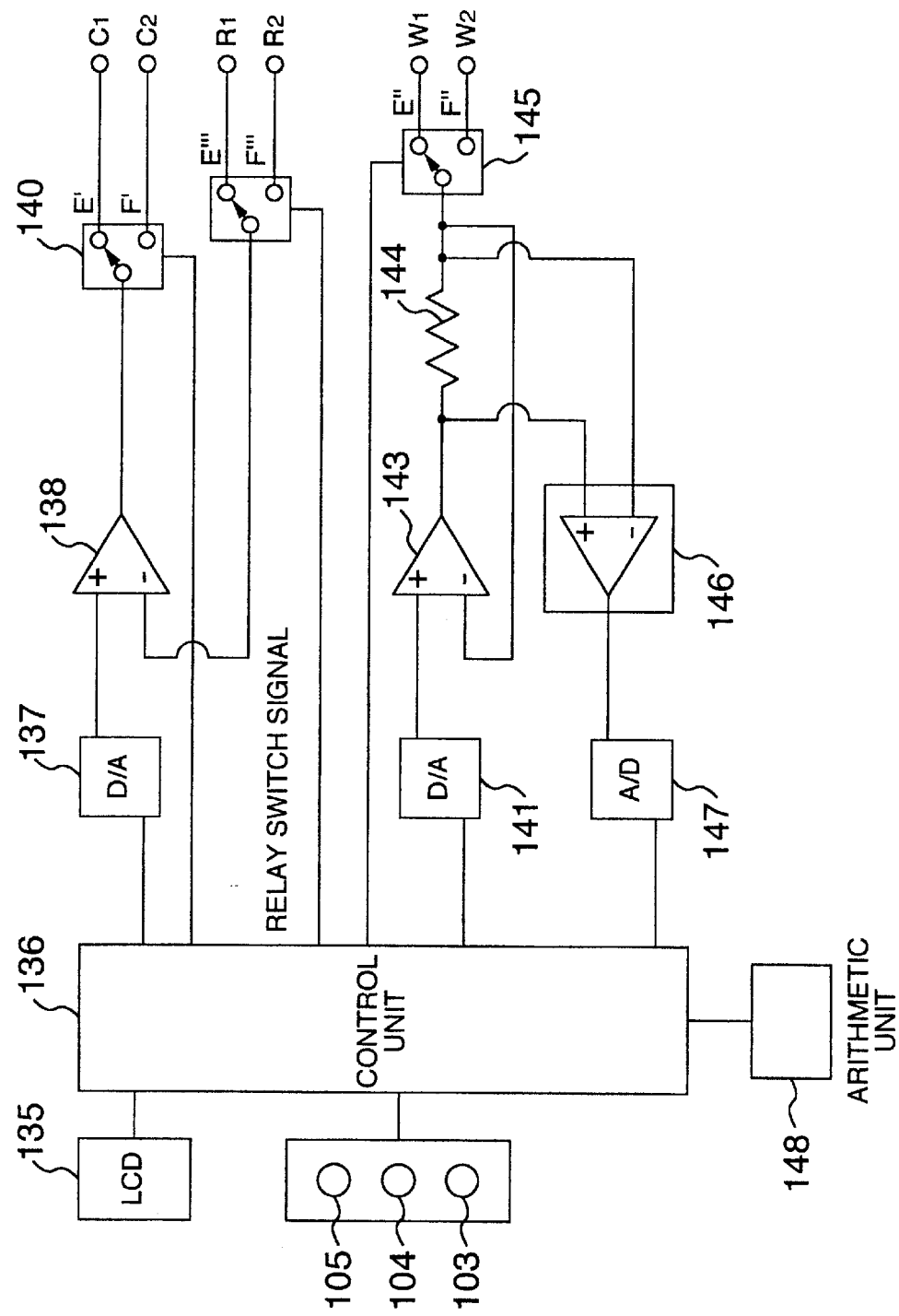
FIG. 12 is a diagram showing a control circuit of the ultraviolet light sensor according to the second embodiment of the invention.

First, the measuring chip G for measuring the received ultraviolet light amount is mounted on a part of the human body in such a position that the first light transmission window 113 of the total light received amount detection unit E and the second transmission window 113' of the ultravioletless received light amount detection unit F are directed toward the sun. After exposure to the sunlight for a predetermined time, the measuring chip G is removed from the body and inserted into the measuring chip insertion unit 106 of the system body 101. As a result, each electrode and the control circuit in the system body 101 are electrically connected to each other. The power button 105 is depressed to energize the ultraviolet light sensor. Further, the start button 103 is depressed to start the measurement. FIG. 12 is a diagram showing a control circuit of the ultraviolet light sensor according to the second embodiment. In FIG. 12, numeral 135 designates a LCD constituting a display unit 2, and numeral 136 a control unit for controlling the ultraviolet light sensor, which control unit is configured with a microcomputer and a memory. The control unit 136 performs the control operation to apply a predetermined potential to each electrode of the measuring chip G while at the same time controlling the LCD 135 so that the arithmetic unit 148 described later is caused to calculate the amount of ultraviolet light from the peak value of the reduction current measured in each of the total light received amount detection unit E and the ultravioletless received amount detection unit F.

Once the start button 103 and the power button 105 are depressed, the control unit 136 turns on the switch in the corresponding circuit thereby making the ultraviolet light sensor ready for operation. The control unit 136 first causes the total light received amount detection unit E to start the detection of the amount of the received light, and upon completion of this operation, instructs the ultravioletless received light detection unit F to detect the received amount of the light with the ultraviolet light thereof cut off.

Numeral 137 designates a D/A converter for converting to an analog signal the data output from the control unit 136 for applying a predetermined potential to the first reference electrode 112, the second reference electrode 112', the first counter electrode 111 and the second counter electrode 111', and numeral 138 an operational amplifier for applying a predetermined potential to the first counter electrode 111 or the second counter electrode 111'. Numeral 139 designates a relay for switching the output to the first reference electrode 112 and the second reference electrode 112', and numeral 140 a relay for switching the output to the first counter electrode 111 and the second counter electrode 111'. Numeral 141 designates a D/A converter for converting into an analog signal the data output by the control unit 36 for applying a predetermined potential for measuring the reduction current to the first working electrode 110 and the second working electrode 110', numeral 143 an operational amplifier for applying a predetermined potential to the first working electrode 110 and the second working electrode 110' to measure the reduction current, numeral 144 a resistor for measuring the current flowing between the first working electrode 110 and the first counter electrode 111 and between the second working electrode 110' and the second counter electrode 111', and numeral 145 a relay for switching between the first working electrode 110 and the second working electrode 110'. Numeral 146 designates a voltage amplifier unit supplied with the drop voltage generated across the resistor 144 for amplifying and outputting the amplified voltage through a differential amplifier circuit configured with an operational amplifier, and numeral 147 an A/D converter for converting the drop voltage amplified by the voltage amplifier unit 146 into data and applying it to the control unit 136. The resistor 144 and the voltage amplifier unit 146 make up a detection unit according to the second embodiment. According to the second embodiment, the first detection unit for detecting the current flowing between the first working electrode 110 and the first counter electrode 111 and the second detection unit for detecting the current flowing between the second working electrode 110' and the second counter electrode 111' can double as each other by switching the relays 139, 140, 145, and thus the circuit is simplified. In similar fashion, according to the second embodiment, the output voltages of the D/A converters 137, 141 can be made variable with the data from the control unit 136, and therefore the voltage between the first working electrode 110 and the first counter electrode 111 and the voltage between the second working electrode 110' and the second counter electrode 111' can be equalized to each other or differentiated from each other. The control unit 136 stores the detected data in an internal memory as current values flowing between the first working electrode 110 and the first counter electrode 111 and between the second working electrode 110' and the second counter electrode 111'. Numeral 148 designates an arithmetic unit which determines the difference of the reduction current value measurement between the total light received amount detection unit E and the ultravioletless received light amount detection unit F, and by comparing the difference with the analytical curve data of the ultraviolet light stored, calculates the received amount of ultraviolet light by interpolation.

Now, the operation of the control circuit according to the second embodiment will be explained. The measuring chip G is inserted into the measuring chip insertion unit 106 of the system body 101 and the power button 105 is depressed to activate the measuring chip G. Further, the start button 103 is depressed for starting the measurement. The control unit 136 turns on each switch of the corresponding control circuit and renders the ultraviolet light sensor ready for operation. Then, the control unit 136 instructs the total light received amount detection unit E to start the detection of the received light amount. In order to measure the reduction current value of the 3-methyl-p-benzoquinone due to the total light rays (sunlight) containing the ultraviolet light, the control unit 136 connects the relay 140 to the E' contact point, the relay 139 to the E''' contact point and the relay 145 to E'' contact point in view of the need to energize or feed the first counter electrode 111, the first working electrode 110 and the first reference electrode 112. After that, the control unit 136 reads the data for the first reference electrode 112 from the memory, and converting it into an analog signal by the D/A converter 137, outputs the analog signal to the operational amplifier 138. The operational amplifier 138 controls the potential applied to the first counter electrode 111 in such a manner as to secure a reference voltage of the first reference electrode 112 conforming with the data using the imaginary shortcircuiting. At the same time, the control unit 136 reads the data for the first working electrode 110 from the memory, and after converting it into an analog signal through the D/A converter, outputs the analog signal to the operational amplifier 143. The operational amplifier 143 constitutes a follower in order to prevent the voltage drop across the resistor 144 for detecting the current from changing the potential of the first working electrode 110 on the output side. As a result, the first working electrode 110 is controlled at a predetermined potential conforming with the data.

According to the second embodiment, the voltammetry is carried out for detecting the light radiation amount of the total light received amount detection unit E, and therefore the control unit 136 sweeps the potential of the first working electrode 110 at the rate of 10 mV/s to 200 mV/s in the range of +800 mV to −1000 mV. The first counter electrode 111 is supplied, by the imaginary shortcircuiting of the operational circuit 138, with such a potential that the first working electrode 110 is set to a predetermined sweeping potential with respect to the potential of the first reference electrode 112. In the process, the value of the reduction current flowing in the first working electrode 110 is detected by the voltage drop across the resistor 144, and after amplification at the voltage amplifier unit 146 and after being converted into data through the A/D converter 147, is applied to the control unit 136. The control unit 136 selects, among the data of the current value making up the voltammogram, the data which becomes the peak value and stores it. This data is the degeneration data for 3-methyl-p-benzoquinone of the total light received amount detection unit E.

Then, the control unit 136 instructs the ultravioletless light received amount detection unit F to detect the received amount of the light from which ultraviolet light is cut off. The ultravioletless light received amount detection unit F also detects the received light amount in a similar manner to the total light received amount detection unit E described above. In order to measure the reduction due to the light rays with the ultraviolet light cut off, the control unit 136 connects the relay 140 to the F' contact point, the relay 139 to the F''' contact point and the relay 145 to the F'' contact point in view of the need to energize the second counter electrode 111', the second working electrode 110' and the second reference electrode 112'. After that, the control unit 136 reads the data for the second reference electrode 112' from the memory, and converting it into an analog signal by the D/A converter 137, outputs the analog signal to the operational amplifier 138. The operational amplifier 138 controls the potential applied to the counter electrode 111' in such a manner as to secure a reference voltage of the second reference electrode 112' conforming with the data using the imaginary shortcircuiting. At the same time, the control unit 136 reads the data for the second working electrode 110' from the memory, and after converting it into an analog signal through the D/A converter, outputs it to the operational amplifier 143. The operational amplifier 143 constitutes a follower in order to prevent the voltage drop across the current-detecting resistor 144 from changing the potential of the second working electrode 110' on the output side. As a result, the second working electrode 110' is controlled at a predetermined potential conforming with the data. The control unit 136 sweeps the potential of the second working electrode 110' at the rate of 10 mV/s to 200 mV/s in the range of +800 mV to −1000 mV. The second counter electrode 111' is supplied, by the imaginary shortcircuiting of the operational amplifier 138, with such a potential that the second working electrode 110' is set to a sweeping potential with respect to the potential of the second reference electrode 112'. In the process, the value of the reduction current flowing in the second working electrode 110' is detected by the voltage drop across the resistor 144, and after amplification at the voltage amplifier unit 146 and after conversion into data through the A/D converter 147, is applied to the control unit 136. The control unit 136, among the data of the current value making up the voltammogram, selects the data which becomes the peak value and stores it in memory. This data is the degeneration data for 13-methyl-p-benzoquinone of the ultravioletless light received amount detection unit F.

Upon acquisition by the control unit 136 of the degeneration data for the 13-methyl-p-benzoquinone for the total light received amount detection unit E and the degeneration data for the 13-methyl-p-benzoquinone of the ultravioletless light received amount detection unit F, the arithmetic unit 148 calculates the received ultraviolet light amount by comparing the data with the analytical curve of the ultraviolet light stored in memory.

According to the second embodiment described above, the control unit 136 determines the peak value of the reduction current by carrying out voltammetry of the amount of ultraviolet light. As an alternative, the amount of the received ultraviolet light can be calculated by measuring the Faraday current by chronoamperometry. In such a case, the control unit 136 sets the relay 140 to the E' contact point, the relay 145 to the E'' contact point and the relay 139 to the E''' contact point, and applies a pulse-shaped or stepped voltage to the first working electrode 110. In the process, the value of the reduction current flowing in the first working electrode 110 is detected by the resistor 144, and after being converted to data through the voltage amplifier unit 146 and the A/D converter 147, applied to the control unit 136. The control unit 136 stores in memory by selecting the data considered as the Faraday current from the data of the current value. Then, the control unit 136 switches the relay 140 to the F' contact point, the relay 145 to the F'' contact point and the relay 139 to the F''' contact point, and applies a pulse-shaped or stepped voltage to the second working electrode 110'. The value of the reduction current flowing in the process is detected by the resistor 144, and after being converted into data through the voltage amplifier unit 146 and the A/D converter 147, applied to the control unit 136. The control unit 136 stores in memory by selecting the data considered as the Faraday current from the data of the current value. The arithmetic unit 148 can calculate the amount of ultraviolet light by comparing the data with the analytical curve of the radiation amount of the ultraviolet light stored in memory.

In this way, the ultraviolet light sensor according to the second embodiment measures the radiation amount of the total light rays by voltammetry, while at the same measuring the radiation amount of the light with the ultraviolet light removed therefrom to determine the difference between the two radiation amounts. Thus, the amount of ultraviolet light radiated on the measuring chip can be calculated. Also, the chronoamperometry shortens the time for measuring the ultraviolet light radiated on the measuring chip.

What is claimed is:

1. An ultraviolet light measuring chip comprising:
a total light received amount detection unit; and
an ultravioletless light received amount detection unit,
wherein said total light received amount detection unit comprises a first reaction chamber for holding a first coexistent electrolyte solution containing a quinone, an organic solvent and an electrolyte and having a first light transmission window with a total light transmission plate;
wherein said ultravioletless light received amount detection unit comprises a second reaction chamber for holding a second coexistent electrolyte solution containing a quinone, an organic solvent and an electrolyte and having a second light transmission window with an ultravioletless light transmission plate;
wherein said first reaction chamber and said second reaction chamber have arranged therein a counter electrode and a reference electrode extending in both of said first reaction chamber and said second reaction chamber and immersed in the respective first and second coexistent electrolyte solutions, said first reaction chamber having arranged therein a first working electrode immersed in the first coexistent electrolyte solution thereof, said second reaction chamber having arranged therein a second working electrode immersed in the second coexistent electrolyte solution thereof and a plurality of terminals are electrically connected to each of said first working electrode, said second working electrode, said counter electrode and said reference electrode.

2. An ultraviolet light measuring chip according to claim 1, wherein said total light transmission plate comprises quartz glass.

3. An ultraviolet light measuring chip according to claim 2, wherein said ultravioletless light transmission plate includes an ultraviolet light cutting filter.

4. An ultraviolet light measuring chip according to claim 1, wherein said ultravioletless light transmission plate includes an ultraviolet light cutting filter.

5. An ultraviolet light measuring chip according to claim 1, wherein said first working electrode and said second working electrode comprise at least one material selected from the group consisting of carbon, glassy carbon and gold.

6. An ultraviolet light measuring chip according to claim 1, wherein said counter electrode comprises a noncorrosive conductor.

7. An ultraviolet light measuring chip according to claim 6, wherein said noncorrosive conductor of said counter electrode comprises at least selected one material selected from the group consisting of platinum, stainles steel, a platinum-containing alloy and carbon.

8. An ultraviolet light measuring chip according to claim 1, wherein said reference electrode is configured of gold or carbon.

9. An ultraviolet light sensor comprising:
a measuring chip insertion unit that is for receiving therein an ultraviolet light measuring chip comprising a total light received amount detection unit; and an ultravioletless light received amount detection unit, wherein said total light received amount detection unit comprises a first reaction chamber for holding a first coexistent electrolyte solution containing a quinone, an organic solvent and an electrolyte and having a first light transmission window with a total light transmission plate; wherein said ultravioletless light received amount detection unit comprises a second reaction chamber for holding a second coexistent electrolyte solution containing a quinone, an organic solvent and an electrolyte and having a second light transmission window with an ultravioletless light transmission plate; and wherein said first reaction chamber and said second reaction chamber have arranged therein a counter electrode and a reference electrode extending in both of said first reaction chamber and said second reaction chamber and immersed in the respective first and second coexistent electrolyte solutions, said first reaction chamber having arranged therein a first working electrode immersed in the first coexistent electrolyte solution thereof, said second reaction chamber having arranged therein a second working electrode immersed in the second coexistent electrolyte solution thereof and a plurality of terminals are electrically connected to each of said first working electrode, said second working electrode, said counter electrode and said reference electrode, and
a connector terminal for being electrically connected to each of said terminals;
a control unit including a first power supply to apply a voltage between said first working electrode and said counter electrode and a second power supply to apply a voltage between said second working electrode and said counter electrode when said ultraviolet light measuring chip is inserted, said control unit sweeping the potential between said first working electrode and said reference electrode and sweeping the potential between said second working electrode and said reference electrode; and
an arithmetic unit including a first detection unit that detects the current flowing between said first working electrode and said counter electrode and a second detection unit that detects the current flowing between said second working electrode and said counter electrode, said arithmetic unit calculating the amount of ultraviolet light from the difference between a value of the current detected by said first detection unit and a value of the current detected by said second detection unit.

10. An ultraviolet light sensor according to claim 9, wherein said second power supply and said first power supply are formed as a single unit with one another.

11. An ultraviolet light sensor according to claim 9, wherein said control unit sweeps at the rate of 10 mV/s to 200 mV/s.

12. An ultraviolet light sensor comprising:
a measuring chip insertion unit that is for receiving therein an ultraviolet light measuring chip comprising a total light received amount detection unit; and an ultravioletless light received amount detection unit, wherein said total light received amount detection unit comprises a first reaction chamber for holding a first coexistent electrolyte solution containing a quinone, an organic solvent and an electrolyte and having a first light transmission window with a total light transmission plate; wherein said ultravioletless light received amount detection unit comprises a second reaction chamber for holding a second coexistent electrolyte solution containing a quinone, an organic solvent and an electrolyte and having a second light transmission window with an ultravioletless light transmission plate; and wherein said first reaction chamber and said second reaction chamber have arranged therein a counter electrode and a reference electrode extending in both of said first reaction chamber and said second reaction chamber and immersed in the respective first and second coexistent electrolyte solutions, said first reaction chamber having arranged therein a first working electrode immersed in the first coexistent electrolyte solution thereof, said second reaction chamber having arranged therein a second working electrode immersed in the second coexistent electrolyte solution thereof and a plurality of terminals are electrically connected to each of said first working electrode, said second working electrode, said counter electrode and said reference electrode; and a connector terminal for being electrically connected to each of said terminals;

a control unit including a first power supply to apply a voltage between said first working electrode and said counter electrode and a second power supply to apply a voltage between said second working electrode and said counter electrode when said ultraviolet light measuring chip is inserted, said control unit controlling the potential between said first working electrode and said reference electrode at a predetermined level with reference to said reference electrode and controlling the potential between said second working electrode and said reference electrode with reference to said reference electrode; and an arithmetic unit including a first detection unit that detects the current flowing between said first working electrode and said counter electrode and a second detection unit that detects the current flowing between said second working electrode and said counter electrode, said arithmetic unit calculating the amount of ultraviolet light from the difference between a value of the current detected by said first detection unit and a value of the current detected by said second detection unit.

13. An ultraviolet light sensor according to claim 12, wherein said second power supply and said first power supply are formed as a single unit with one another.

14. An ultraviolet light measuring chip comprising:

a total light received amount detection unit; and an ultravioletless light received amount detection unit, wherein said total light received amount detection unit includes a first reaction chamber for holding a first coexistent electrolyte solution including a quinone, an organic solvent and an electrolyte and having a first light transmission window with a total light transmission plate, said first reaction chamber having arranged therein a first working electrode, a first counter electrode and a first reference electrode immersed in said first coexistent electrolyte solution;

wherein said ultravioletless light received amount detection unit includes a second reaction chamber for holding a second coexistent electrolyte solution including a quinone, an organic solvent and an electrolyte and having a second transmission window with an ultravioletless light transmission plate, said second reaction chamber has arranged therein a second working electrode, a second counter electrode and a second reference electrode immersed in said second coexistent electrolyte solution; and a plurality of terminals are electrically connected to said first working electrode, said first counter electrode, said first reference electrode, said second working electrode, said second counter electrode and said second reference electrode.

15. An ultraviolet light sensor comprising:

a measuring chip insertion unit that is for receiving therein an ultraviolet light measuring chip comprising a total light received amount detection unit; and an ultravioletless light received amount detection unit, wherein said total light received amount detection unit includes a first reaction chamber for holding a first coexistent electrolyte solution including a quinone, an organic solvent and an electrolyte and having a first light transmission window with a total light transmission plate, said first reaction chamber has arranged therein a first working electrode, a first counter electrode and a first reference electrode immersed in said first coexistent electrolyte solution; wherein said ultravioletless light received amount detection unit includes a second reaction chamber for holding a second coexistent electrolyte solution including a quinone, an organic solvent and an electrolyte and having a second transmission window with an ultravioletless light transmission plate, said second reaction chamber having arranged therein a second working electrode, a second counter electrode and a second reference electrode immersed in said second coexistent electrolyte solution; and a plurality of terminals are electrically connected to said first working electrode, said first counter electrode, said first reference electrode, said second working electrode, said second counter electrode and said second reference electrode; and a connector terminal for being electrically connected to each of said terminals;

a control unit including a first power supply to apply a voltage between said first working electrode and said first counter electrode and a second power supply to apply a voltage between said second working electrode and said second counter electrode when said ultraviolet light measuring chip is inserted, said control unit sweeping the potential between said first working electrode and said first reference electrode and sweeping the potential between said second working electrode and said second reference electrode; and an arithmetic unit including a first detection unit that detects the current flowing between said first working electrode and said first counter electrode and a second detection unit that detects the current flowing between said second working electrode and said second counter electrode, said arithmetic unit calculating the amount of ultraviolet light from the difference between the value of the current detected by said first detection unit and the value of the current detected by said second detection unit.

16. An ultraviolet light sensor comprising a measuring chip insertion unit that is for receiving therein an ultraviolet light measuring chip comprising a total light received amount detection unit; and an ultravioletless light received amount detection unit, wherein said total light received amount detection unit includes a first reaction chamber for holding a first coexistent electrolyte solution including a quinone, an organic solvent and an electrolyte and having a first light transmission window with a total light transmission plate, said first reaction chamber has arranged therein a first working electrode, a first counter electrode and a first reference electrode immersed in said first coexistent electrolyte solution; wherein said ultravioletless light received amount detection unit includes a second reaction chamber for holding a second coexistent electrolyte solution including a quinone, an organic solvent and an electrolyte and having a second transmission window with an ultravioletless light transmission plate, said second reaction chamber having arranged therein a second working electrode, a second counter electrode and a second reference electrode immersed in said second coexistent electrolyte solution; and a plurality of terminals are electrically connected to said first working electrode, said first counter electrode, said first reference electrode, said second working electrode, said second counter electrode and said second reference electrode; and a connector terminal for being electrically connected to each of said terminals;

a control unit including a first power supply to apply a voltage between said first working electrode and said first counter electrode when said ultraviolet light measuring chip is inserted, and a second power supply to apply a voltage between said second working electrode and said second counter electrode, said control unit controlling the potential between said first working electrode and said first reference electrode to a predetermined level based on said first reference electrode, and controlling the potential between said second working electrode and said second reference electrode to a predetermined level based on said second reference electrode; and an arithmetic unit including a first detection unit that detects the current flowing between said first working electrode and said first counter electrode and a second detection unit that detects the current flowing between said second working electrode and said second counter electrode, said arithmetic unit calculating the amount of ultraviolet light from the difference between the value of the current detected by said first detection unit and the value of the current detected by said second detection unit.

17. A method of measuring ultraviolet light, comprising the steps of:
(a) radiating total light on a first coexistent electrolyte solution containing a quinone, an organic solvent and an electrolyte;
(b) radiating the total light with ultraviolet light cut off therefrom on a second coexistent solution containing a quinone, an organic solvent and an electrolyte;
(c) performing voltammetry of each of the first coexistent electrolyte solution irradiated with the total light and the second coexistent electrolyte solution irradiated with the total light with ultraviolet light cut off therefrom; and
(d) calculating the amount of ultraviolet light by determining the difference between reduction current values of said first coexistent electrolyte solution and said second coexistent electrolyte solution obtained in step (c).

18. A method of measuring ultraviolet light, comprising the steps of:
(a) radiating total light on a first coexistent electrolyte solution containing a quinone, an organic solvent and an electrolyte;
(b) radiating the total light with ultraviolet light cut off therefrom on a second coexistent solution containing a quinone, an organic solvent and an electrolyte;
(c) performing chronoamperometry of each of the first coexistent electrolyte solution irradiated with the total light and the second coexistent electrolyte solution irradiated with the total light with ultraviolet light cut off therefrom; and
(d) calculating the amount of ultraviolet light by determining the difference between reduction current values of said first coexistent electrolyte solution and said second coexistent electrolyte solution obtained in step (c).

* * * * *